Nov. 9, 1937.    J. S. BARNES ET AL    2,098,220
MATERIAL WORKING APPARATUS
Original Filed Aug. 12, 1932    12 Sheets-Sheet 8
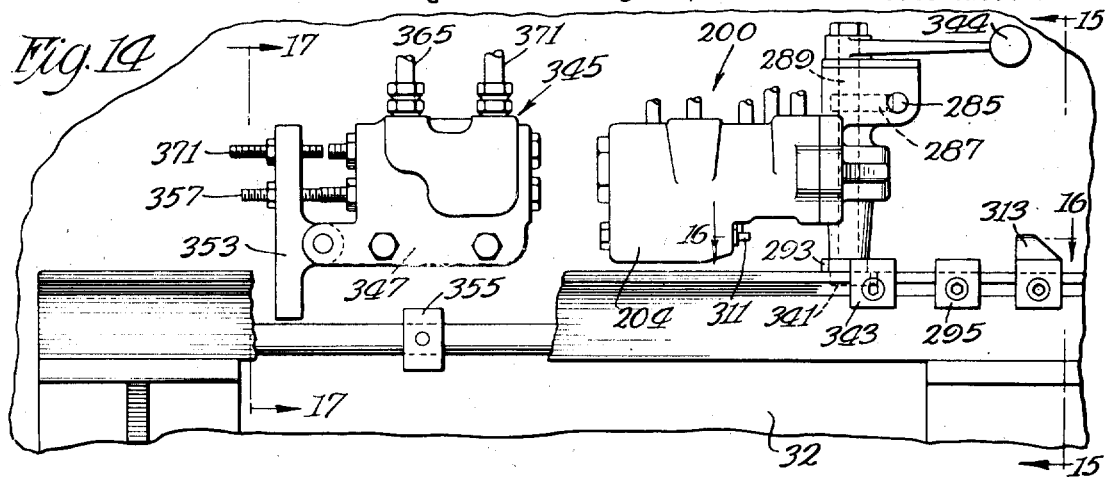
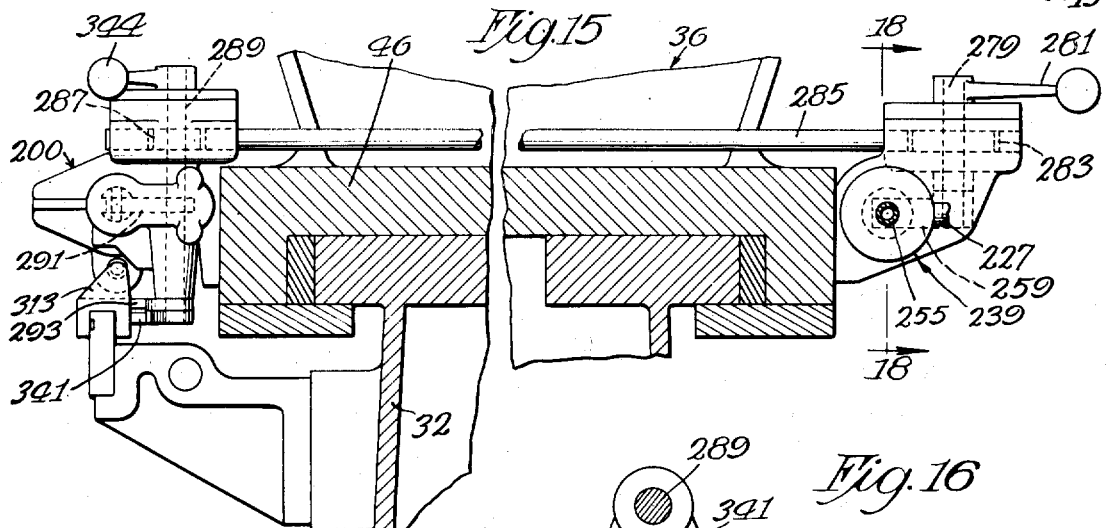
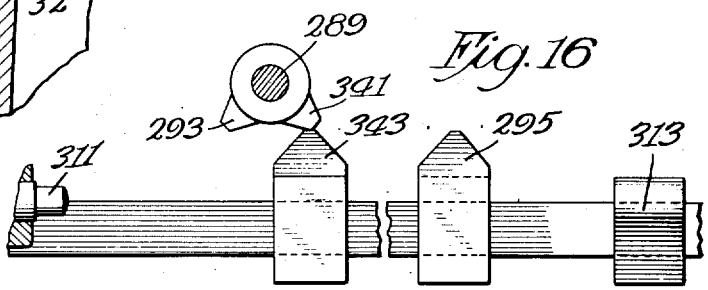
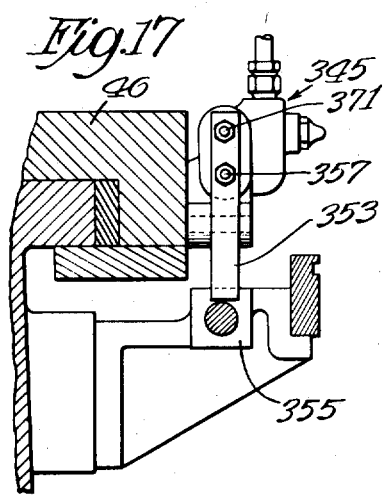
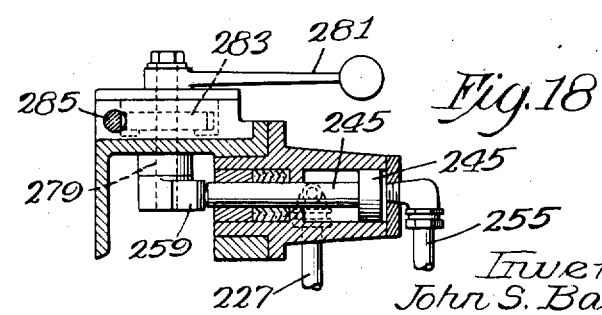
Inventors
John S. Barnes
Paul R. Guirl
George C. Johnson
By Cox & Moore Attys.

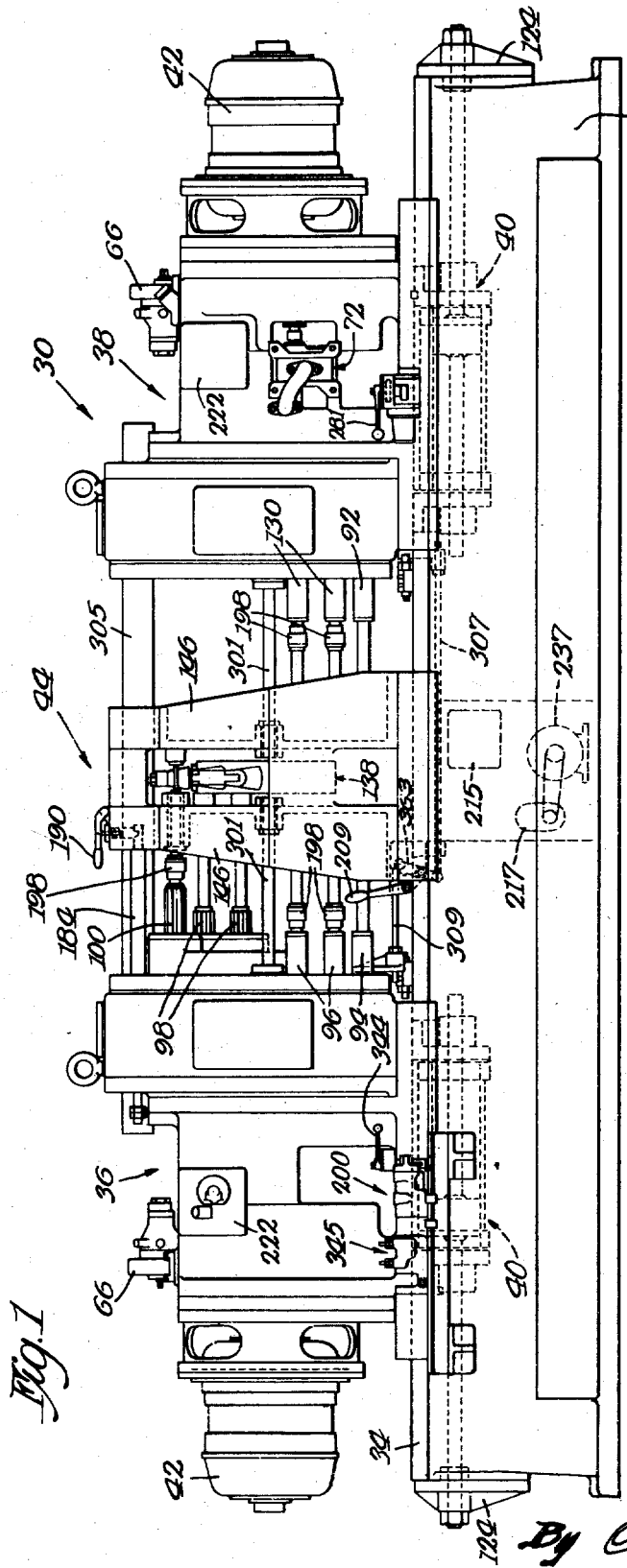

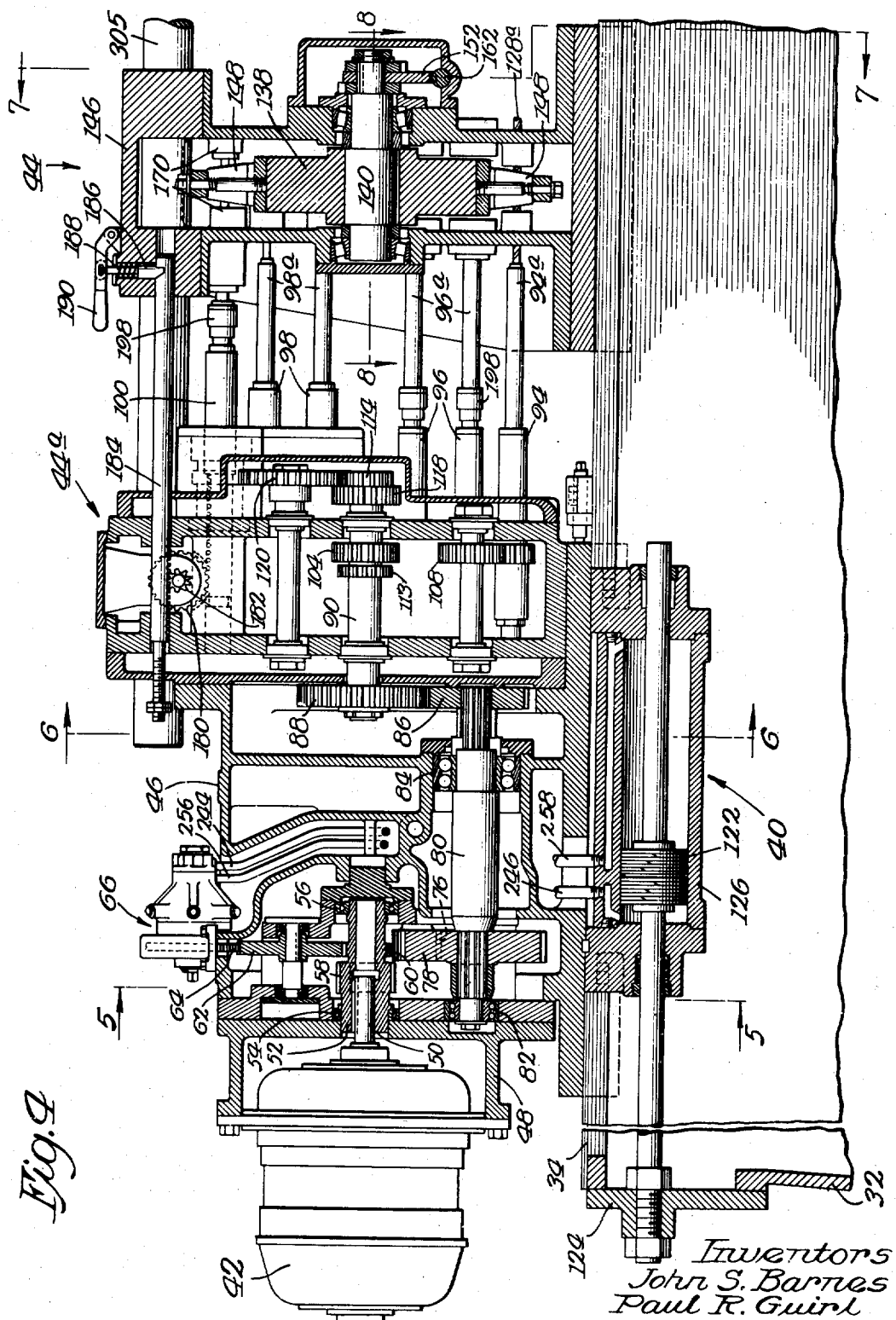

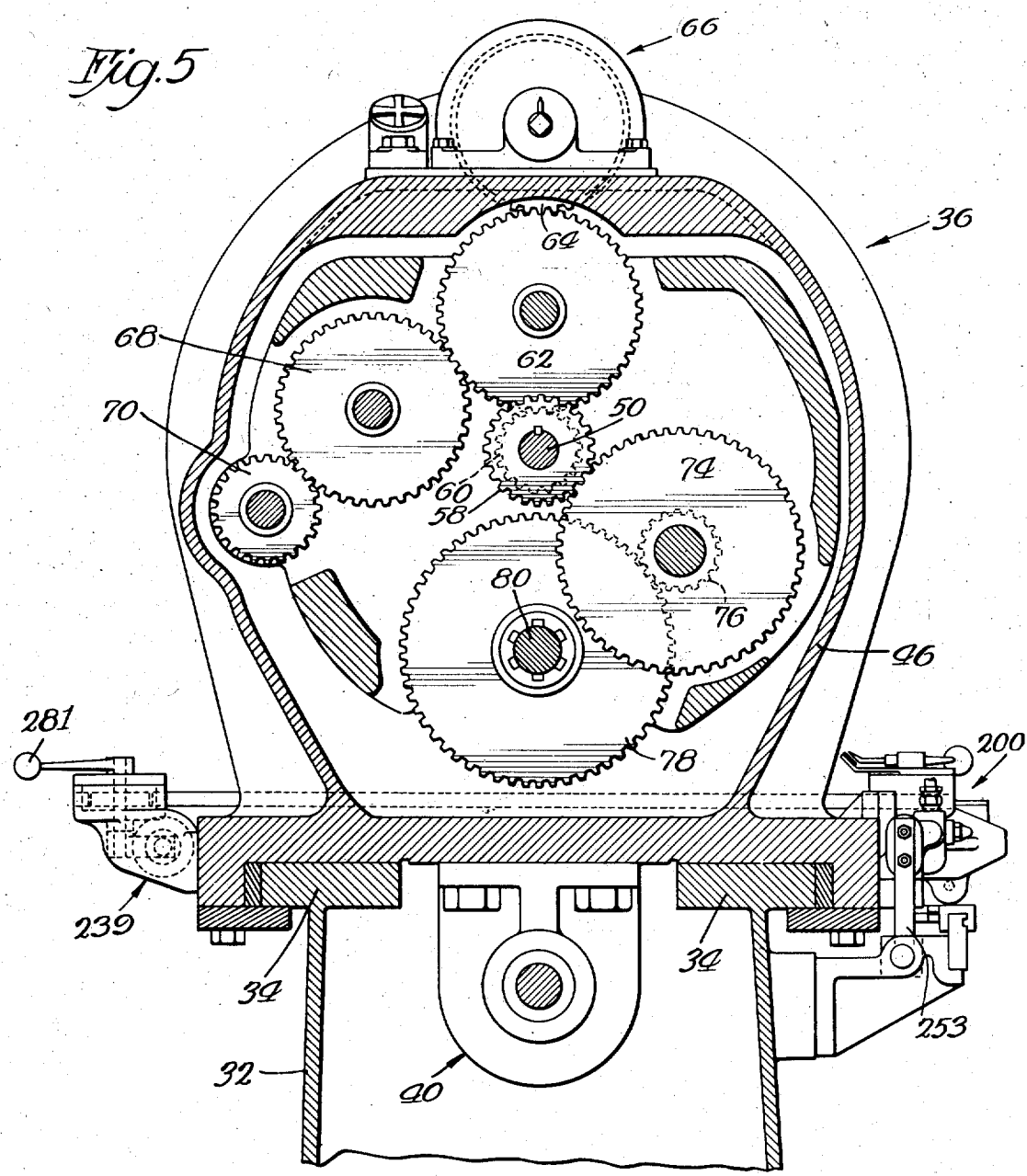

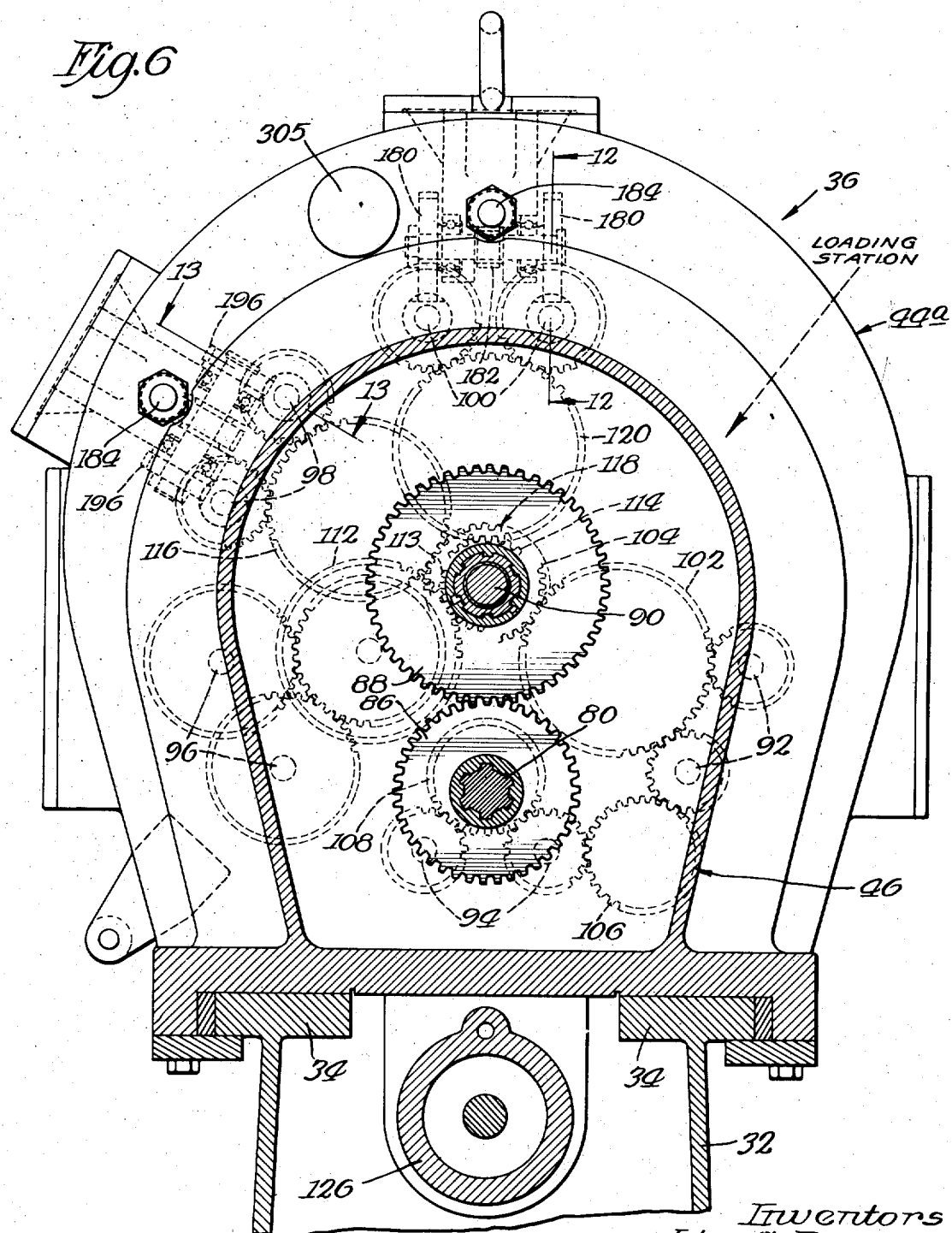

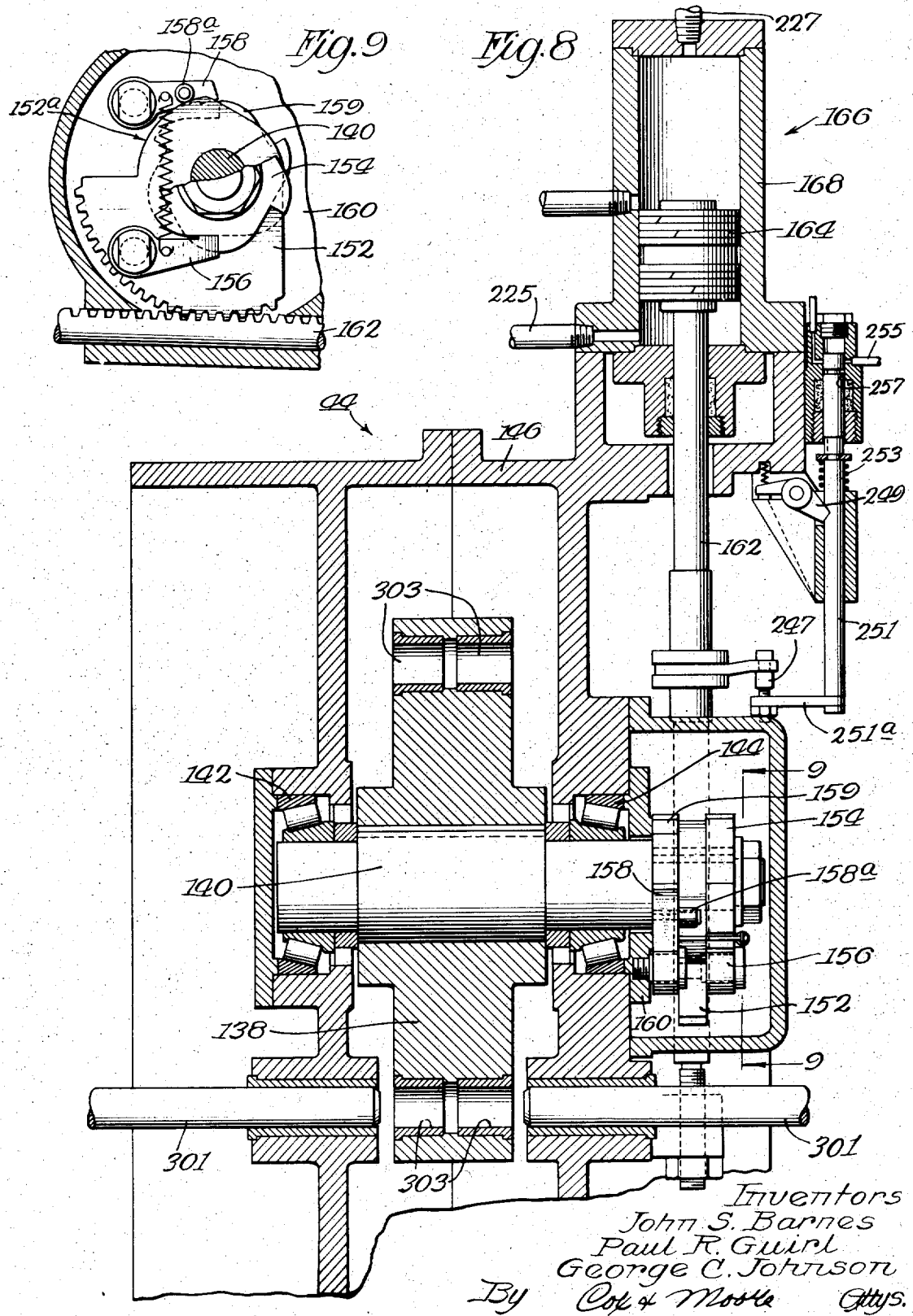

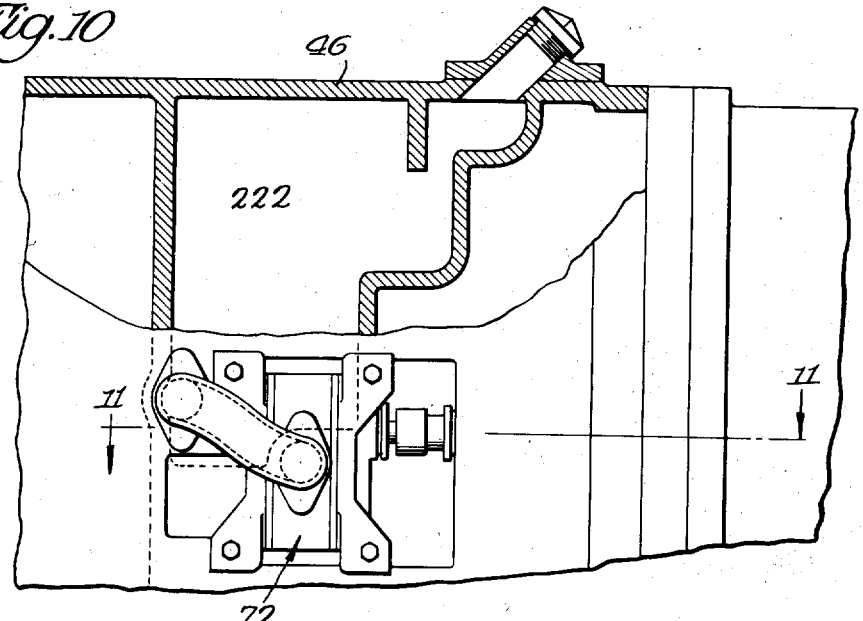
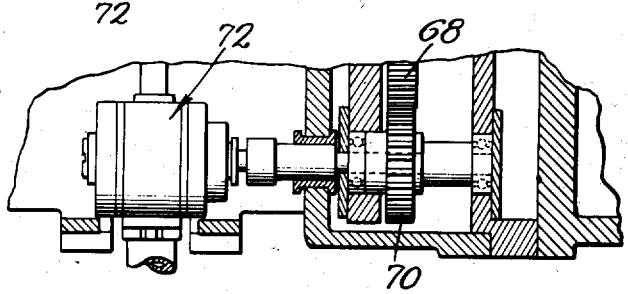
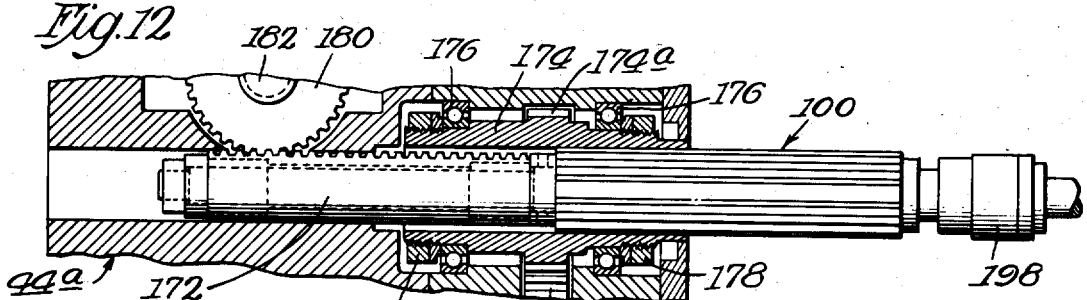
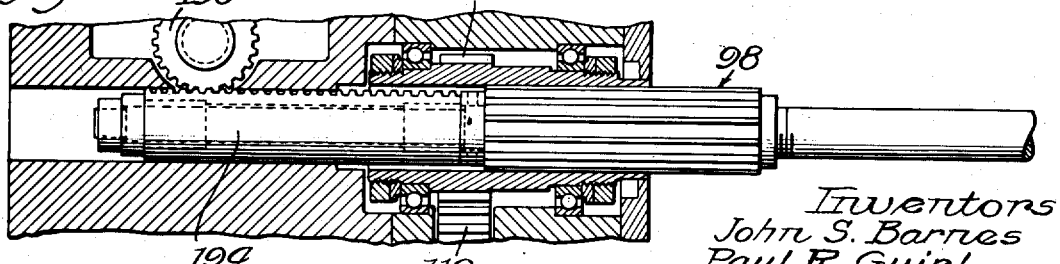

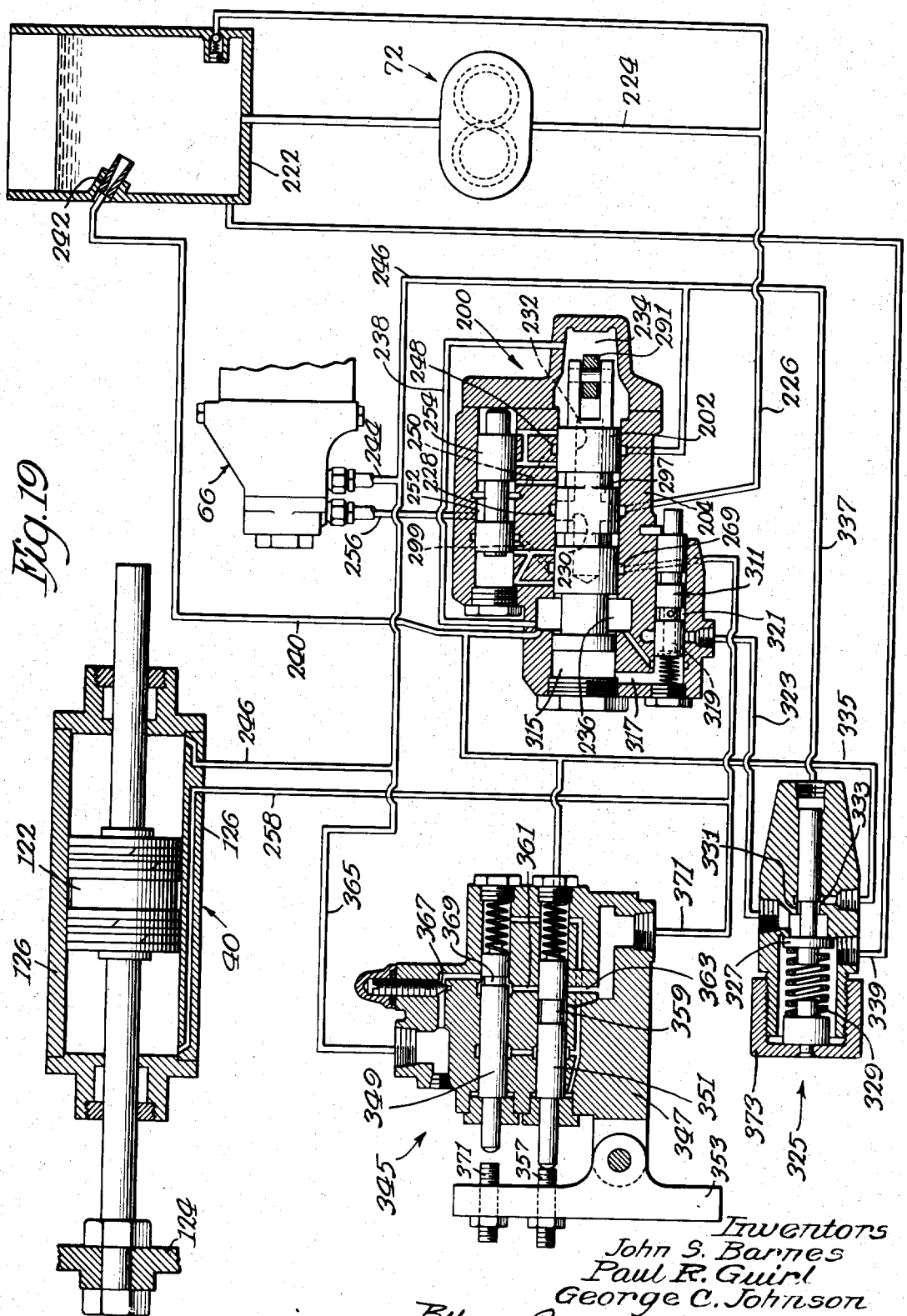

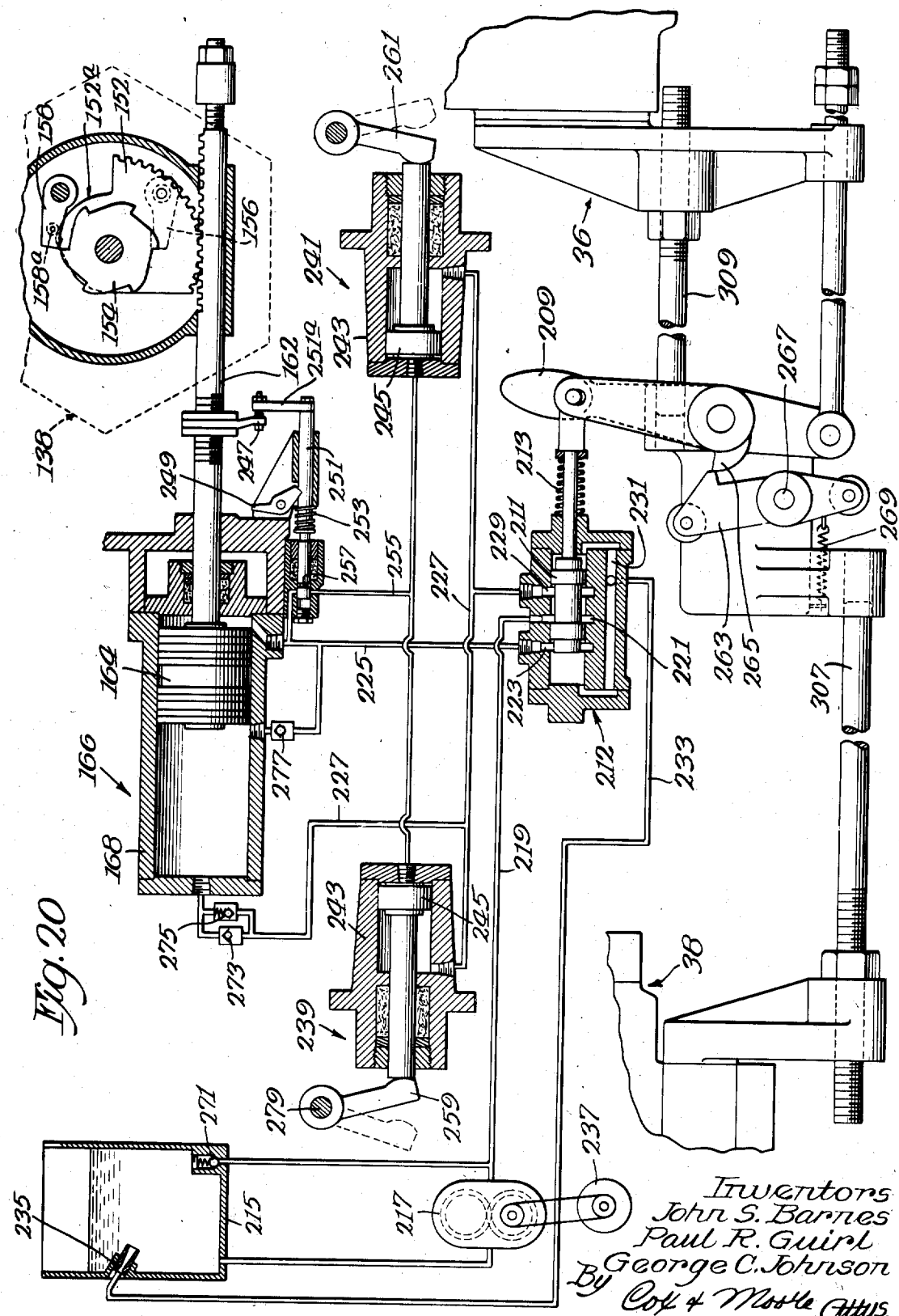

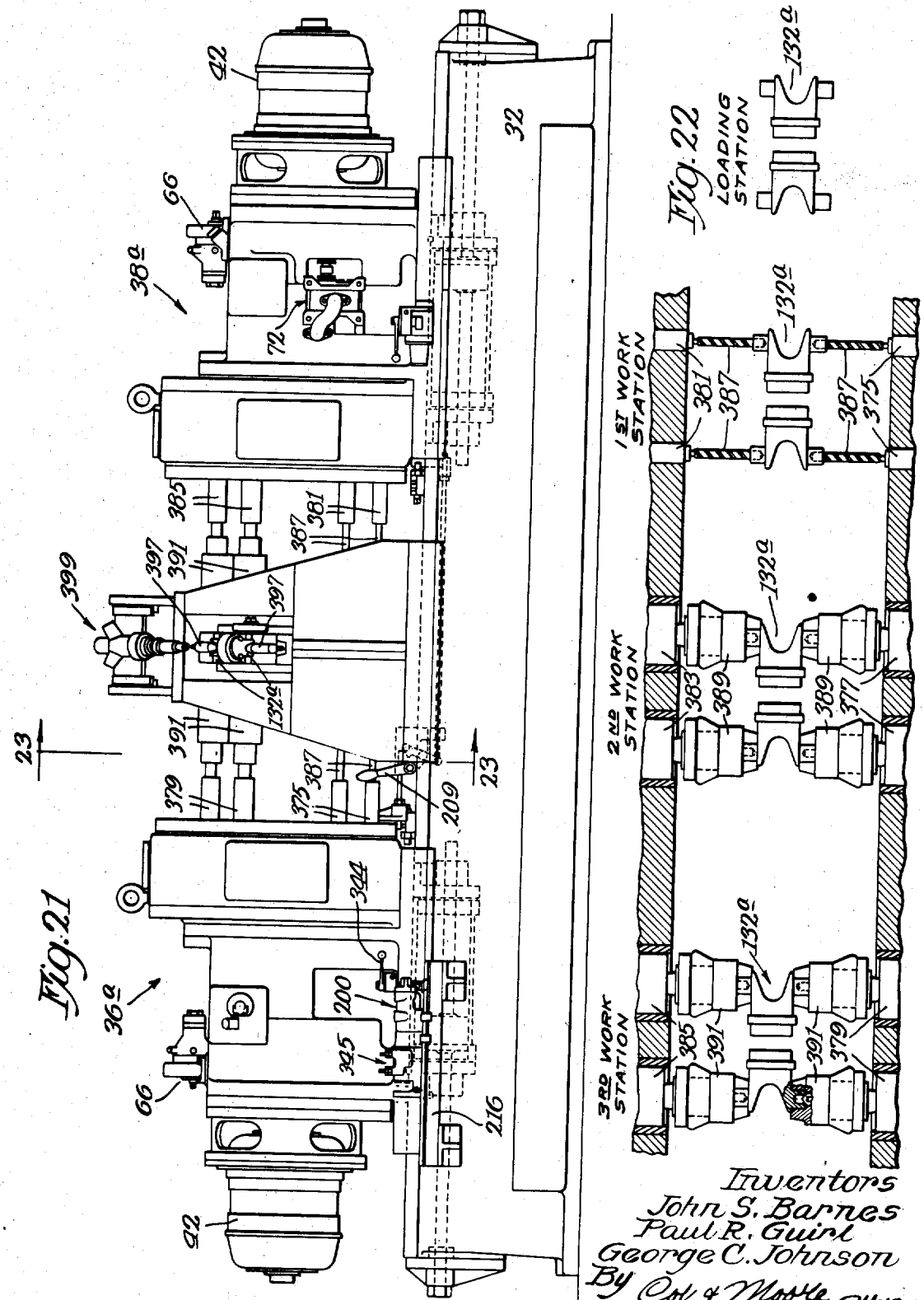

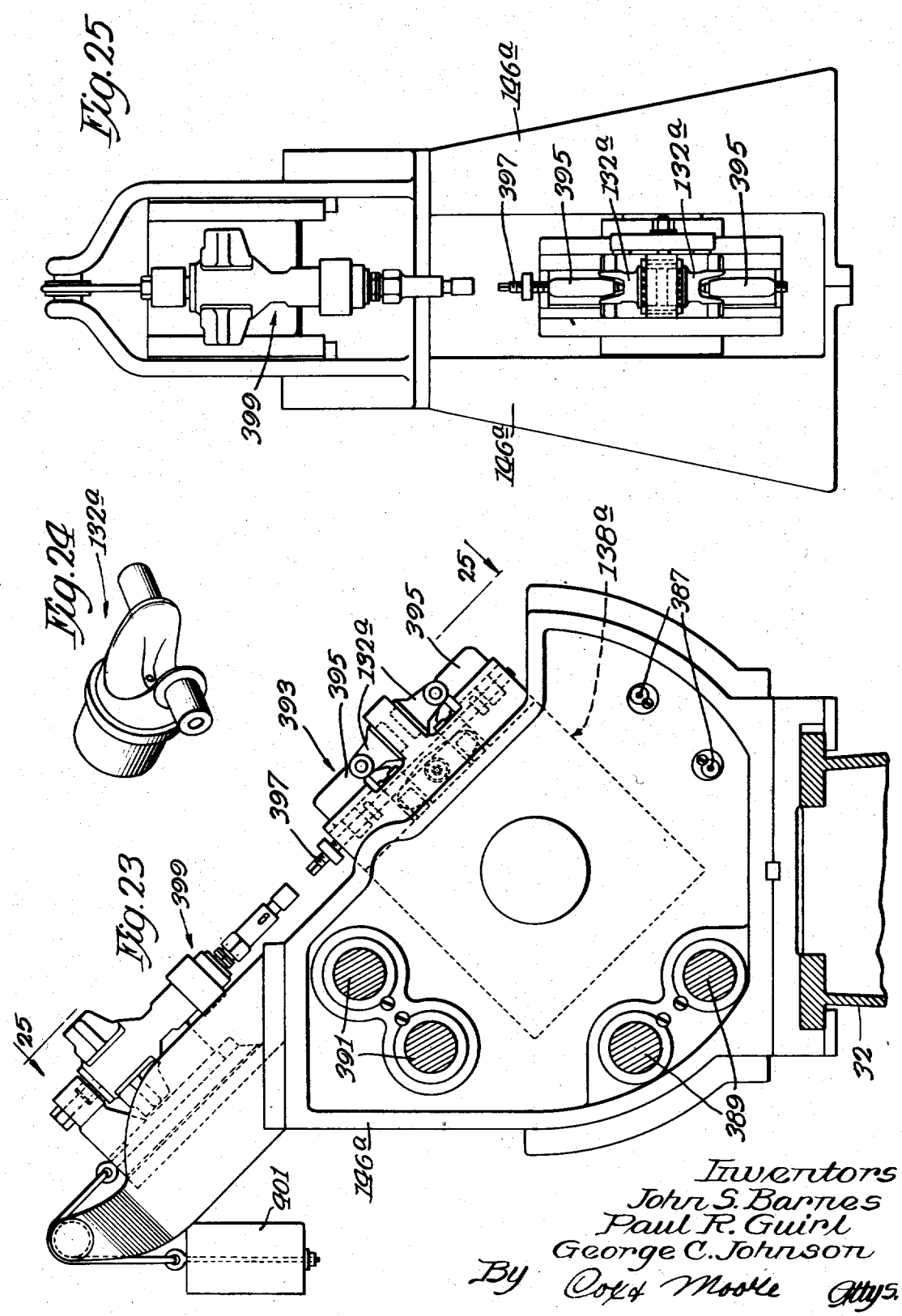

Patented Nov. 9, 1937

2,098,220

UNITED STATES PATENT OFFICE 2,098,220

MATERIAL WORKING APPARATUS

John S. Barnes, Paul R. Guirl, and George C. Johnson, Rockford, Ill., assignors to W. F. & John Barnes Company, Rockford, Ill., a corporation of Illinois Application August 12, 1932, Serial No. 628,580
Renewed December 5, 1936

48 Claims. (Cl. 29—38)

This invention relates generally to metal working apparatus, and more particularly to machines of the type adapted to simultaneously operate upon opposite sides of a plurality of work-pieces. Production methods of the present day have been developed with the view of turning out work at increased speed to enable the finished product to be sold to the public at relatively low prices. This fact is particularly noticeable in connection with the manufacture of automobiles, wherein production methods and machines have been employed to reduce the time and effort required to machine parts which are ultimately assembled in the finished product. Experience has shown that even slight changes in machining operations have enabled the ultimate drastic reduction in price to the consumer. One of the serious problems that confronts manufacturers, as well as machine designers, is that of obtaining increased production without sacrificing accuracy, workmanship, etc. In other words, increased production must not be made at the expense of accuracy.

In many of the metal working machines previously designed, it has been impossible to satisfactorily machine a work-piece from opposite sides thereof. The fact that in most instances it has been necessary to clamp or chuck workpieces in one position for a machining operation and then reclamp or rechuck the piece to complete the machining thereof, has made it practically impossible to produce a plurality of workpieces all having the same desired accurate alinement of surfaces, etc. In the automotive industry, for example, parts must be interchangeable, and therefore it is most desirable to have all of the machined surfaces on each piece accurately disposed with respect to each other and conforming within closed limits to the dimensions necessary in order to render the devices interchangeable. Rechucking of a piece introduces certain errors because it is practically impossible to secure a work-piece in two positions for machining operations without introducing some discrepancies in the finished product.

The present invention relates to that class of machinery designed to "step up" production, and it is one of the important objects of this invention to provide metal working apparatus, which will increase the rate at which parts may be machined without, to the slightest degree, affecting the resultant accuracy, and, in fact, which will enable parts to be machined with greater accuracy and with less effort by an operator.

A further object of the invention is to provide metal working apparatus or machines whereby balanced machining operations may be performed upon a work-piece; that is to say, the work-piece may be acted upon from opposite sides without subjecting it to strains or stresses, which would introduce errors in alinement, dimensions, etc., in the finished product, and by employing this balanced method of metal removing, an increase in the amount of metal removed is obtained without, to the slightest degree, subjecting the work-piece to distortion.

Another object of the present invention is to produce a device for accurately positioning workpieces, and to this end it is proposed to clamp a work-piece once, and thereafter machine all of the surfaces which must be kept within very close limits of accuracy. In other words, the invention contemplates a machine in which the necessity of rechucking or clamping, after a portion of the machining operation has been completed, is eliminated.

Still another object of the present invention is to provide method and means whereby a step by step metal removing process may be performed in such a manner that the simultaneous removal of metal from opposite ends or sides of clamped work-pieces may be accomplished without subjecting said work-pieces to strains or stresses which would introduce dimensional errors, and whereby the time required to perform machining operations on a plurality of work-pieces is materially reduced.

A further object of the present invention is to provide a work holding device which is so arranged that a plurality of tools can be conveniently positioned on opposite sides thereof, and driving mechanisms for said tools may also be conveniently positioned to enable each set of tools to be moved as a unit into engagement with opposite sides of a work-piece, whereby to enable a plurality of different cutting operations to be performed upon a single work-piece in an improved and effective manner.

Another object is to provide in a machine as set forth above, means for accurately guiding the tools during their metal removing process, and also means for accurately positioning the work holder with respect to the units supporting said tools.

A further important object of the present invention is to provide an improved practical machine, whereby a plurality of parts may be simultaneously operated upon from opposite sides thereof, and whereby parts may be effectively indexed to a plurality of positions until the machining thereof has been completed.

More specifically, the invention contemplates the provision of metal working apparatus, in which a work holder positioned intermediate a pair of oppositely disposed reciprocable heads is adapted to be indexed through a plurality of positions in timed relation with the movements of the cutting tools carried by said heads, whereby machining operations may be successively performed on opposite sides of the work.

Still another object of the present invention is to provide in a machine or metal working apparatus of the type mentioned above, hydraulic means for effecting the movement of the heads, as well as improved mechanism for causing the work holder to be indexed.

A further object of the invention is to provide in combination with a machine of the aforementioned type safety devices which are adapted to prevent the functioning of the index mechanism out of timed relation with the functioning of the tool carrying heads.

The present invention further contemplates a novel arrangement of self-contained actuator units or drill units in combination with a shiftable work holder or work supporting unit whereby production of work is greatly expedited.

The foregoing and numerous other objects and advantages will be more apparent from the following detailed description when considered in connection with the accompanying drawings, wherein—

Figure 1 is a front elevational view of a machine or metal working apparatus, embodying features of the present invention;

Figure 2 is a perspective view of one type of work-piece adapted to be machined by the apparatus shown in Figure 1;

Figure 3 discloses the successive steps or machining operations performed by the machine of Figure 1;

Figure 4 is an enlarged central sectional view of the lefthand head of the improved machine as viewed in Figure 1;

Figure 5 is an enlarged transverse sectional view of the machine taken substantially along the line 5—5 of Figure 4;

Figure 6 is a similar enlarged transverse sectional view taken substantially along the line 6—6 of Figure 4;

Figure 7 is a similar vertical sectional view taken substantially along the line 7—7 of Figure 4;

Figure 8 is an enlarged plan sectional view of the work holder and indexing mechanism, said view being taken substantially along the line 8—8 of Figure 7 and line 8—8 of Figure 4;

Figure 9 is a fragmentary sectional view taken along the line 9—9 of Figure 8, disclosing the relative positions of the pawl and ratchet mechanism which forms a part of the device for indexing the work holder;

Figure 10 is an enlarged fragmentary elevational view shown partly in section of the gear pump and associated reservoir;

Figure 11 is a fragmentary horizontal sectional view of the gear pump and driving means associated therewith, said view being taken substantially along the line 11—11 of Figure 10;

Figure 12 is an enlarged fragmentary sectional view taken substantially along the line 12—12 of Figure 6, disclosing in detail the structural arrangement of the spindle at work station No. 5;

Figure 13 is a similar sectional view taken substantially along the line 13—13 of Figure 6, disclosing the spindle construction of work station No. 4;

Figure 14 is an enlarged front elevational view of the main control valve mechanism, the bleeder valve mechanism, and the associated operating dogs;

Figure 15 is a fragmentary transverse vertical sectional view taken substantially along the line 15—15 of Figure 14;

Figure 16 is a fragmentary plan sectional view of the dogs and valve actuating fingers, said view being taken substantially along the line 16—16 of Figure 14;

Figure 17 is a fragmentary transverse vertical sectional view taken substantially along the line 17—17 of Figure 14;

Figure 18 is a detail central sectional view of the hydraulic actuator which is adapted to automatically effect the shifting of the main control valve;

Figure 19 discloses the hydraulic circuit arrangement for controlling the functioning of the spindle heads;

Figure 20 discloses a hydraulic circuit arrangement coupled with machine elements to disclose the manner in which the indexing mechanism is hydraulically controlled in timed relation with the movements of the spindle supporting heads;

Figure 21 is a view similar to Figure 1 disclosing an apparatus equipped to machine a workpiece which differs structurally from that disclosed in Figures 2 and 3, the machine of Figure 21 being also equipped with a modified work clamping mechanism;

Figure 22 discloses the machining operations performed upon the work-piece by the machine of Figure 21;

Figure 23 is a transverse vertical sectional view taken substantially along the line 23—23 of Figure 21, disclosing the position of the spindles and the structural arrangement of the modified work clamping mechanism;

Figure 24 is a perspective view of the work-piece shown in Figure 22; and

Figure 25 is a top view of the modified work clamping mechanism taken substantially along the line 25—25 of Figure 23.

Referring now to the drawings more in detail wherein like numerals have been employed to designate similar parts throughout the various figures, it will be seen that one embodiment of the invention, as shown in Figures 1 to 20 inclusive, includes a metal working apparatus designated generally by the numeral 30, Figure 1. This apparatus or machine 30 includes an elongated base or bed 32, which is provided along its upper surface with guides 34, Figures 1 and 4 to 6 inclusive.

Reciprocably mounted upon the guides 34 is a pair of spindle supporting heads 36 and 38. These heads are practically identical in structural arrangement and are designed to support and drive a plurality of spindles later to be described. The elements on each head will be given the same numerical designation as the identical elements in the other head. Each of the heads is adapted to be reciprocated along the guides 34 by suitable hydraulic actuators designated generally by the numeral 40, and each of these heads supports a prime mover or electric motor 42 for driving their respective tool supporting spindles. Positioned intermediate the heads 36 and 38 is a work holding mechanism designated generally by the numeral 44, and this mechanism is designed to support a plurality of work-pieces in position to be simultaneously acted upon by the tools supported within the heads 36 and 38.

Spindle supporting heads

Except for the fact that the head 36 is designed to support and drive more spindles than the head 38, both of said heads are structurally identical, and hence a detailed description of one will suffice for the other. The head 36 which supports the most spindles (five sets in all) is disclosed somewhat in detail in Figures 4 to 8 inclusive. The head 36 includes a main frame 46 which is slidably mounted along the upper surface of the guides or ways 34. A subframe or flange 48 secured to the left end of the main frame 46, Figure 4, supports the prime mover or electric motor 42. The motor shaft 50 is keyed to an elongated gear member 52 which, in turn, is mounted within anti-friction bearings 54 and 56. With this arrangement and mounting of the elongated gear 52, the lateral stresses or movements experienced by the motor shaft 50 are not imparted to the gear 52. Further, by having the motor shaft keyed to the gear as shown, variations in longitudinal displacement of the motor shaft are not transmitted to the gear. This elongated gear member 52 is formed with a central driving gear 58 and a smaller driving gear 60. The gear 60, Figures 4 and 5, meshes with and drives a gear 62 which, in turn, drives a gear 64. This gear 64 forms the driving element for a feed or plunger pump designated generally by the numeral 66. The gear 62 through a train of gears 68 and 70 drives a rapid traverse pump, such as a gear pump 72, Figures 5, 10, and 11. The pump 72 may be of any suitable design, and, as an example of one pump which may be satisfactorily employed, reference is made to the pump disclosed in the co-pending application, Serial No. 430,868, filed February 21, 1930, which has since matured into Patent No. 1,912,737 and the feed pump is preferably of a nonleakable type such as that disclosed in the co-pending application, Serial No. 430,867, filed February 21, 1930, which has since matured into Patent No. 1,989,117. The invention is not limited to any particular type of feed or rapid traverse pumps, but it is very important that the feed pump be of a design which is adaptable for closed circuit work.

The gear 58 through reduction gears 74, 76, and 78 transmits power to a drive shaft 80, Figures 4 and 5. The left end of this shaft 80 is splined to the gear 78 and is mounted within an anti-friction bearing 82, while the right end thereof is mounted within a larger anti-friction bearing 84 and supports one of a pair of pick-off gears 86 and 88. The gear 88 is driven from the gear 86 and is keyed to a drive shaft 90 supported within an auxiliary spindle supporting head which is designated generally by the numeral 44a.

Auxiliary spindle head

At this point it should be understood that the specific structural arrangement of the auxiliary spindle supporting head 44a does not form a part of the present invention, but in order to obtain a clear understanding of the operation of the machine, it is necessary that certain structural features thereof be described in detail.

The shaft 90 serves as a source of power supply for five pairs of tool supporting spindles which are designated in Figure 6 as 92, 94, 96, 98, and 100. The spindles 92 are driven from a gear 102, which meshes with a gear 104 splined to the drive shaft 90, Figure 4. The spindles 94 are driven through an idler gear 106 which meshes with one of the spindles 92, as clearly shown in Figure 6. A second idler gear 108 is interposed between the spindles 94. Spindles 96 are driven from a gear 110 which is driven from a gear 112 and a drive gear 113 carried by the shaft 90. The spindles 98 are driven from a gear 116 which meshes with a gear 118. The spindles 100 are driven from a gear 120 which meshes with a gear 114. Thus it will be apparent that all of the spindles receive their power from a single source, namely, the drive shaft 90 which, in turn, is driven by the pick-off gears 86 and 88. In order to vary the speed of the spindles, it is only necessary to accordingly change the pick-off gears.

Movement is imparted to the head 36 by the hydraulic actuator 40, which includes a stationary piston 122 secured at one extremity to a bracket 124 on the machine bed 32. The piston 122 is mounted within a cylinder 126 carried on the underside of the main frame 46, Figures 4 and 6, and when fluid is introduced within the right end of the cylinder 126, as viewed in Figure 4, the head will be shifted to the right, and when fluid enters the left end of the cylinder, said head will be moved to the left. A clear understanding of the hydraulic system of control will be more apparent when the description of the circuit is later described in detail.

The structure of the head 38 is similar to the head 36, except that the head 38 supports only two pairs of spindles, namely, spindles 128 and 130, Figure 3. The spindle arrangement just described is particularly adapted for machining a work-piece of the type shown in Figures 2 and 3, said work-piece being designated generally by the numeral 132. This work-piece includes a body or flange 134 having a section 136 formed integral therewith. This section 136 must be accurately machined to the proper dimension designated by the letter A, Figure 3, and must be provided with an accurately formed central aperture B. To secure the work-pieces 132 in proper position during the functioning of the heads 36 and 38, the work holding fixture or device 44 is employed.

Work support

This device is best shown in Figures 1 and 7 to 8 inclusive. A relatively large multi-sided block 138 is keyed to a shaft 140 supported between roller bearings 142 and 144, Figure 8. These roller bearings are, in turn, supported by a frame 146 which rests upon and is secured to the upper surface of the machine bed 32. The block 138 is of hexagonal cross section and is adapted to receive a pair of work-pieces 132 in the manner shown in Figure 7. Suitable clamps 148 are employed to secure a pair of work-pieces against the outer surface of the block 138. Each pair of clamps may be simultaneously secured or released by merely turning a nut 150. It will thus be apparent that the block 138 is adapted to support at one time six pairs of work-pieces, and that five of these pairs of work-pieces are adapted to be simultaneously acted upon by the tools supported in the heads 36 and 38. The frame 146 of the work holding device or fixture 44 is arranged at the front side of the machine so as to expose one set of the clamping members 148 in a convenient position to be manipulated by an operator. This position may be properly referred to as the loading station, because at this point a completed pair of work-pieces is removed and another pair clamped in position.

Work indexing mechanism

To automatically effect the successive shifting of the work-pieces from one position or station to another, the pawl and ratchet mechanism shown in Figures 7 to 9 inclusive is employed. This mechanism includes a gear quadrant 152 which is loosely mounted upon the shaft 140. A ratchet 154 keyed to the shaft 140 is adapted to be partially rotated in a counter-clockwise position, as viewed in Figure 7, through the action of a spring-pressed pawl 156 pivotally mounted upon the quadrant 152. A second pawl 158 is pivotally mounted upon a non-rotatable plate 160 and cooperates with a second ratchet 159 to prevent the block 138 from over-running its working position. A pin 158a on the pawl 158 rides upon a cam surface 152a of the quadrant 152 during the indexing movement, and permits inward movement of the pawl 158 in time to prevent continued rotation of the ratchet 158 upon the completion of the indexing movement. Movement is imparted to the quadrant through the agency of a rack bar 162, which is connected to the piston 164 of a hydraulic actuator designated generally by the numeral 166. This piston 164 reciprocates within a cylinder 168 supported by the frame 146, and, as it moves to the right, Figure 7, causes the work supporting block 138 to be shifted through one-sixth of a revolution, thereby presenting a pair of completed work pieces, previously acted upon by the tools in the spindles 100, in position to be removed and replaced by another pair of work-pieces. The movement of the actuator piston 164 is timed in accordance with the movement of the heads 36 and 38, as will later be described in more detail.

In order to establish absolute alinement of the tools with respect to the work-pieces supported within the mechanism 44, the frame 146 is formed with a plurality of guides 170, Figures 3 and 4. These guides or bushings 170 are alined with the devices which clamp the work-pieces in place and serve to accurately guide each tool as it approaches the work-piece. In this manner any lateral distortion or displacement, to which the spindles in the heads 36 and 38 may be subjected, does not introduce inaccuracies during the cutting action upon the work-piece. Referring to Figure 3, it will be seen that the spindles 92 in the head 36 and the companion spindles 128 in the head 38 support drills 92a and 128a respectively, which are designed to partially drill an aperture within the section 136 of the work-piece 132. This may be referred to as the first work station. At the second work station the spindles 94 cause drills 94a carried thereby to complete the drilling operation in the work-piece, while at station 3 the spindles 96 and companion spindles 130 in the head 138 cause tools or cutters 96a and 130a respectively to face the opposite sides of the section 136. At station 4 the spindles 98 carry reaming tools 98a which make a roughing, reaming cut within the work-piece, and at station 5 the spindles 100 support finishing reamer tools 100a, which accurately finish the aperture B within the work-piece 132. In this connection it should be noted that guiding shanks 100c associated with the reamers 100a cooperate with bushings 170 within the frame 146 to maintain absolute alinement of said reamers. The work-piece 132 shown in the drawings forms a part of a universal joint used in automobiles, and the machined surfaces must therefore be very accurately disposed with respect to each other in the finished product. In fact, these universal joint members must, when they are assembled in an automobile, maintain dynamic balance at high speeds, and hence the slightest variation will cause deleterious wear and distortion. Furthermore, these work-pieces are interchangeable, and therefore each piece must be identical in size with another piece.

Spindle speed increasing mechanism

Attention is directed to the fact that the tools 98a and 100a must travel faster than the other tools, and therefore means must be provided to superimpose a longitudinal movement to the spindles 98 and 100 to cause said spindles to travel at a rate which is faster than the normal rate of advancement of the head 36. This is accomplished by employing the mechanism which is best disclosed in Figures 4, 6, 12, and 13. In Figure 12 is shown one of the spindles 100 at station No. 5, and it will be seen that this spindle 100 is coupled with a rack member 172, and that said spindle makes a splined connection with a rotary collar 174. This collar 174 is formed integral with a gear 174a which meshes with the gear 120 previously described, and thus rotation is imparted to the spindle through the driving action of the gear 120. The collar 174 is mounted on opposite sides of the gear proper 174a in anti-friction bearings 176, and is secured against longitudinal displacement by means of suitable clamping collars or rings 178. The auxiliary spindle support head 44a causes the spindle 100 to advance toward the clamped or chucked work-piece 132. In order to increase this forward advancement of the spindle above the normal travel of the auxiliary head 44a, a gear 180 coupled with a pinion 182 is employed, which meshes with a normally fixed rack bar 184. Rotation of the pinion 182 in the rack bar 184, acting through the larger gear 180, causes the spindle to experience a forward movement with respect to the auxiliary head or frame 44a. It will be seen that the rack bar 184 is secured against longitudinal movement by means of a latch member 186, Figure 4. This latch member 186 may be elevated against a coil spring 188 through the action of a lever 190 to enable the convenient withdrawal of the rack bar 184. The structural arrangement of the spindle 98, Figure 13, is identical with the structural arrangement of the spindle 100, except that the spindle 98 has a slower forward movement superimposed thereon than the spindle 100. A bar 184 similar to the previously described bar 184 is similarly associated with the spindle 98. It will be seen that rotation is imparted to the spindle 98 by the gear 116 which meshes with a gear 192 corresponding with the gear 174a shown in Figure 12. The spindle 98 is also formed with a rack section 194, which meshes with a gear 196 corresponding with the gear 180. It will be noted that the gear 196 is smaller than the gear 180 and hence imparts a slower movement to the spindle 98. From the semi-diagrammatic disclosure in Figure 3, it will be seen that the tools 100a, being equipped with extensions or guiding shanks 100c, must be moved at a faster rate than the reaming tools 98a in order to complete their forward movement simultaneously with the completion of the forward movement of the spindle 98. Furthermore it is desirable, in view of the fact that reaming tools are driven by the spindle 98, to have these tools advance at a faster rate than the drills 92a and 94a.

Attention is also directed to the fact that the spindles are coupled with their respective tools by means of flexible couplings 198. These couplings 198 provide sufficient resiliency between the tools and the spindles so as to enable the tools to effectively seek their proper predetermined locations within the bushings 170 of the frame 146, and further, prevent the spindles from transmitting to the tools lateral stresses experienced during the movement of the heads. In other words, the flexible couplings cooperate to enable the ultimate, accurate machining operation to be performed by the tools.

Main operating valve mechanism

Having set forth in a general way the various structural features of the machine shown in Figures 1 to 20 inclusive, the control mechanism for governing the timed operation of the heads, indexing mechanism, and the like will now be described. These features can best be described by setting forth in conjunction therewith a general statement of operation of the machine. Before setting forth the statement of operation, it should be noted that high pressure fluid for feeding purposes from the pump 66 and low pressure fluid for rapid traverse purposes from the pump 72 is controlled through the agency of a main operating valve designated generally by the numeral 200, Figures 1 and 14 to 19 inclusive. This valve 200 includes a cylindrical valve member 202 longitudinally reciprocable within a housing 204.

Assume that the valve member 202 occupies its central or neutral position shown in Figure 19, and that the pumps 66 and 72 are being driven by the prime mover or motor 42. The pump 72 under such circumstances withdraws fluid from a reservoir 222 provided within the head 36 and discharges fluid through a conduit 224 and a conduit 223 to a central valve passage or port 228. This passage 228 now registers with a passage 230 in the valve member 202, which directs fluid through a second longitudinal passage 232, Figure 19, into an end chamber 234. The chamber 234 is in constant communication with a chamber 236 at the opposite end of the valve casing through a conduit indicated generally by the numeral 238. It should be understood that in the actual construction of the valve this conduit is embodied within the valve housing, but for the purpose of simplifying the disclosure, said passage is shown diagrammatically in Figure 19. Fluid from the chamber 236 passes through a conduit 240, which returns fluid to the reservoir 222 through a fixed restricted orifice 242. Thus, when the valve member 202 occupies the position shown in Figure 19, fluid from the pump 72 circulates therethrough against the pressure established by the presence of the restricted orifice 242, and the valve member 202 remains in balance within its casing 204. It will also be noted that fluid from the plunger pump 66 is discharged through a conduit 244, a conduit 246, a valve passage or port 248, a passage 250, a port 252 within a shiftable control member or valve 254 and thence through a conduit 256 to the intake side of the pump 66. Thus it will be apparent that neither of the pumps is propelling the actuator 40.

Statement of operation

Assume now that a pair of work-pieces 132 has been clamped in position at the loading station, Figure 7, and that a control mechanism or handle 209, Figure 20, is shifted to the left. This control handle 209 causes a valve 211 of an index control mechanism 212 to shift to the left against the action of a coil spring 213. Fluid from a reservoir 215 mounted beneath the index mechanism 44, Figures 1 and 20, is delivered by a gear pump 217 through a conduit 219 to a central valve passage or port 221 and thence through a passage or port 223 and a conduit 225 to the right end of the hydraulic actuator 166. This causes the piston 164 to move to the left, thereby shifting the work supporting block 138 a sixth of a revolution so as to bring the previously clamped work-pieces into position to be acted upon by the tools 92a at the first work station. Fluid from the left end of the cylinder 166 passes through a conduit 227 and returns through a passage or port 229 in the index control mechanism 212, and from this passage returns through a passage 231 in the mechanism 212 through a return conduit 233 and a restricted orifice 235 into the reservoir 215. Power is supplied to the pump 217 from any suitable source, such as an electric motor 237 which is also positioned beneath the index mechanism 44 within the bed 232, Figures 1 and 20. Attention is now directed to a pair of valve actuating devices 239 and 241, each of which includes a cylinder or casing 243 and plungers or pistons 245. Fluid from the return conduit 227 is also directed at this time into association with the left end of the piston in the mechanism 239 and the right end of the piston in the control mechanism 241, as clearly shown in Figure 20. In other words, fluid from the conduit 227 maintains the pistons 245 in the position shown.

As the indexing piston 164 approaches the limit of its stroke to the left, Figure 20, an arm 247 engages the upper portion of a pivoted finger 249 and thereby releases a valve bar 251. A coil spring 253 then urges the valve bar 251 to the left and establishes communication between the conduit 225 and a conduit 255 through an annular valve port or passage 257. This conduit 255 communicates with the inner extremities of the cylinders 243, and thus the pistons or plungers 245 are urged outwardly against arms 259 and 261 which are mechanically connected with the main control valve 200 of the heads 36 and 38 respectively. Movement of these arms 259 and 261 causes each of the valve members 202 to be shifted to its rapid approach position, which would be to the right in Figure 19. As previously stated, both valve mechanisms 200 are identical, and hence a description of the function of one, namely, the valve mechanism on the head 36 will suffice for an understanding of the valve mechanism associated with the head 38.

From the foregoing it will be apparent that no automatic shifting of the main control or operating valves 200 takes place until the indexing of the work support has been completed. A pivoted latch member 263, Figure 20, cooperates with a latch lug 265 on the control lever mechanism 209 to secure it in its left position against the action of the coil spring 213. The latch member 263 is pivoted at 267 and is urged in a clockwise direction by a spring 269. A relief valve 271 is provided in the reservoir 215 to take care of any excessive pressures developed by the pump 217, and suitable check valves 273, 275, and 277 are provided in association with the conduits connected with the cylinder 166 for purposes which will be apparent as the description progresses.

The manner in which the valve actuating pistons or plungers 245 act to control the shifting of the main control valves 200 to their rapid approach position will be more apparent from Figures 5, 15, 18, and 20. It will be seen that the fingers 259 and 261 are each mounted on a vertical shaft 279, the upper end of which carries a handle 281 to enable manual remote control. This shaft 279 carries a gear 283 which meshes with a rack in a cross bar 285. The opposite extremity of this cross bar has a similar rack which meshes with a gear 287 mounted upon a vertical shaft 289. This shaft carries an arm 291, which makes a slotted connection with the right end of the valve member 202, as clearly shown in Figure 19. Thus movement of the fingers 259 and 261 occasioned by their companion plungers 245 will cause a movement of the valve members 202 through the agency of the gear and rack structure just described.

With the valve member 202 shifted to its rapid approach position, namely, to the right, Figure 19, fluid from the rapid traverse pump 72 passes from the valve member 202 through the conduit 246 into the right end of the actuator cylinder 126. This causes the head 36 to be moved at a rapid rate toward the work support 44. Fluid from the left end of the actuator cylinder 126 passes outwardly through a conduit 258 into a valve passage or port 260, which now communicates with the chamber 236. Thus fluid is returned through the conduit or pipe line 240 to the restricted orifice 242 and then to the reservoir 222. It will be observed that the central section of the valve member 202 does not present a complete cylindrical cross-section. Opposite sides of this section are relieved to present the areas 297 which permits fluid to pass therethrough. As shown in Figure 19, the upper and lower sections of the central portion of the valve slidably engage the companion surfaces of the bore in the casing 204, while the oppositely disposed relieved sections 297 of the valve member present a passage which permits fluid received from the conduit 226 to pass into the valve port 248 and thence into the conduit 246 when the valve member is shifted to the right. Likewise, the area 297 permits fluid received from the conduit 226 into the valve port or passage 269 when the valve member 202 occupies its left position.

As the heads 36 advance at a rapid rate, the tools supported thereby eventually pass into the guide bushings 170 within the work supporting mechanism, and, as the tools reach the work piece, a finger 293, Figures 14 to 16 inclusive, engages an abutment or dog 295, thereby causing the valve member 202 to be returned to the position shown in Figure 19. As the valve 202 shifts to this position, a sudden building up of pressure is experienced within the area 297 of the valve member, Figure 19, and this is transmitted to the right end of the shiftable feed pump control member 254. This causes the member 254 to be suddenly shifted to the left, thereby connecting the feed pump 66 in a closed circuit with the hydraulic actuator 40. This circuit may be traced as follows: From the feed pump 66 through the conduit 244, the conduit 246 to the right end of the actuator cylinder 126, from the left end of said cylinder to the conduit 258 into the valve port or passage 269 through a passage 299, which now communicates with the central valve port or chamber 252. This chamber 252 now communicates through the conduit 256 with the intake side of the feed pump 66. It will be seen that the portion of the conduit 246 connected with the valve port 248 is now closed by the member 254. In this manner both of the heads 36 and 38 are advanced at a feeding rate during the cutting action of the tool. Attention is directed to the fact that during the cutting operation the work supporting block is secured in absolute alinement by means of guide bars 301 carried by each head. These bars enter apertures 303, Figure 8. It should also be noted that a large horizontally disposed bar or shaft 305 extends across the upper portion of the machine so as to lend rigidity to the heads, indexing mechanism, and work support.

As the heads move forwardly, a rod 307 carried by the head 36, Figure 20, and a rod 309 carried by the head 38 eventually engage rollers carried at opposite extremities of the pivoted latch member 263, thereby releasing the control lever mechanism 209. The spring 213 automatically shifts the lever mechanism 209 to the right, thereby causing fluid from the pump 217 to be delivered to the left end of the actuator cylinder 166 and returning the piston 164 to the position shown in Figure 20. During this movement the pawl 154 clicks past the next ratchet tooth in position to form an indexing operation upon the return movement of the piston 164. It should also be noted that when the piston 164 reaches the position shown in Figure 20, fluid entering the left end of the cylinder 166 passes outwardly through the check valve 277 and then through the return conduit 225. As the piston 164 approaches the position shown in Figure 20, the arm 247 engages a companion arm 251a on the valve bar 251 and shifts said bar sufficiently to reset the latch finger 249 and thereby prevent movement of the bar to the left until the next indexing operation is completed.

As the tools reach the limit of their cutting stroke, the right end of a valve member 311, Figures 14 to 16 inclusive and Figure 19, engages an abutment or dog 313. Movement of the valve member 311 to the left, Figure 19, enables fluid from the left valve chamber 315 to flow through a passage 317, a longitudinal passage 319 within the valve member 311, an annular port 321 and then through a conduit 323. This conduit 323 connects with a reversing control mechanism 325. This mechanism 325 includes a valve member 327 which is normally urged to the right into the position shown in Figure 19 by means of a coil spring 329. In this position fluid from the conduit 323 must pass through a restricted annular opening 331 through an outlet port 333 into a conduit 335, which communicates with the restricted orifice 242 through the conduit 240. When the pressure within the right end of the cylinder 126 increases sufficiently to set up pressure within a conduit 337 communicating with the right end of the valve member 327, said member shifts to the left against the action of the coil spring 329 and permits fluid from the conduit 323 to pass outwardly through a conduit 339 which connects with the reservoir 222. Upon the actuation of the valve member 327 fluid from the left chamber 315 of the main operating valve is suddenly released and the normal valve balancing pressure of the fluid within the chamber 234 is sufficient to cause the valve member 202 to be suddenly shifted to its left rapid reverse position. In this position the rapid traverse pump 72 serves to direct fluid in a reverse direction to the actuator cylinder 126, and the feed pump control member 254 is automatically returned to the position shown in Figure 19.

As the heads reach their initial or starting position, a finger 341 engages an abutment or dog 343, Figures 14 to 16 inclusive, thereby automatically returning the valve member 202 to neutral. It will be understood, of course, that a similar set of dogs or fingers is associated with each head. By merely urging the lever mechanism 209 to the left, Figure 20, a second cycle of operation is initiated. It will be apparent that after the work support has been indexed through five successive stations, each indexing thereof will present a completed pair of work-pieces at the loading station. The valve mechanism 200 may also be manually controlled by manipulating a valve control handle 344, or it may be remotely controlled by manipulation of the handle 281.

Slow feed mechanism

Attention is now directed to a slow feed mechanism designated generally by the numeral 345, Figures 14 and 19. This mechanism includes a casing or housing 347 secured to one side of each head and includes a pair of shiftable valve members 349 and 351. The mechanism 345 is only used in instances where it is desirable to slow down the movement of a head, for example, when it is desired to make a heavier cut. This mechanism 345 serves to divert a predetermined amount of fluid before it is delivered to the actuator cylinder 126 and thereby slow up the movement of the head connected therewith. The operation of the mechanism 345 is as follows: When the head 36 continues to advance during this feeding stroke, a pivoted arm 353 carried by the mechanism 345 engages an abutment or dog 355. This swings an adjustable screw 357 into engagement with the valve member 351, thereby causing an annular port 359 thereof to register with passages 361 and 363. With the valve members 349 and 351 in the positions just described, fluid diverted from the conduit 246 through a conduit 365 passes through an adjustable needle valve 367 through an annular passage or port 369 in the valve member 349 and thence through the passages 369, 359, 363, and a conduit 371, which connects with the return conduit 258. It will thus be apparent that by adjusting the needle valve 367 to a predetermined position, a predetermined amount of fluid may be diverted so as to effect a definite decrease in rate of movement of the head. When the arm 353 has been shifted sufficiently to carry a second adjustable stop or screw 371 into engagement with the valve member 349, the communication between the needle valve 367 and the return pipe line 258 is closed. It should be understood that the bleeder valve mechanism 345 is only employed when the nature of the work-piece to be machined requires it. Suitable coil springs are provided at the right end of the valve members 349 and 351 to automatically urge said members to the left when the screws 357 and 371 are free to be shifted to the left. In order to vary the amount of dwell in the head occasioned by the use of the mechanism 325, an adjustable cap 373 is provided which operates to vary the load placed upon the coil spring 329. It will be apparent that when a dwell at the end of the feeding stroke of the head is not required, the mechanism 325 may be disconnected, and in that case the conduit 323 would be connected directly with the return conduit 339.

Modified structure

In Figures 21 to 25 inclusive a slightly modified work support and work clamping means are shown. The heads of the device shown in Figures 21 to 25 inclusive and the control mechanism therefor are similar to the structures previously described, the only difference being that the heads of Figure 21, which I have designated generally by the numerals 36a and 38a are equipped with three sets of spindles. The spindles of the head 36a are designated by the numerals 375, 377, and 379, while the spindles of the head 38a are designated similarly by the numerals 381, 383, and 385. The spindles 375 and 381 are equipped with drills 387, while the spindles 377 and 383 are equipped with hollow mills 389 adapted to perform a roughing operation. The spindles 379 and 385 are equipped with finishing hollow mills 391. The work piece designated generally by the numeral 132a is adapted to be secured or clamped in position within a four-sided block 138a which operates similar to the six-sided block 138 previously described. A clamping mechanism designated generally by the numeral 393 includes a pair of clamping members 395, which are adapted to be urged toward and away from the work-piece through the agency of a screw 397. The rotation of this screw may be conveniently controlled by a suitable driving mechanism 399 mounted at the upper portion of a frame 146a. This mechanism 399 is normally held in its uppermost position, as shown in Figure 23, by means of a weight 401, and, when manually urged downwardly, automatically couples itself with the exposed end of the screw 397. After a work-piece has been placed in position, it is only necessary to manually urge the driving device 399 into operative association with the screw and thereby cause the members 395 to clampingly engage the work piece. Similarly, when it is desired to release the work-piece, it is only necessary to effect a reverse rotation of the mechanism 399 and bring it into operative association with the screw 397. The structural details of the device 399 are not disclosed because the structural features per se of this device do not form a part of the present invention. In fact, any suitable rotary driving mechanism adapted to be moved into and out of association with the screw 397, may be employed.

The work-piece 132a also forms a part of a universal joint, and hence the machining operations thereon must be very accurately performed. The work supporting block 138a may be indexed through the three work stations in the manner already described in connection with the block 138, and the heads 36a and 38a perform a cycle of operations similar to that previously described in connection with the heads 36 and 38, mills, etc. The hollow mills shown in Figure 22 are designed to not only face the opposite exposed surfaces of the work-piece 132a, but also to accurately countersink the apertures previously formed by the drills. These operations must be performed with extreme accuracy, and this is accomplished to a large extent by employing the above described machines for guiding each of the tools, and also the means for accurately securing the work support or turret in its indexed position during the machining operations.

Summary

From the foregoing it will be apparent that the present invention contemplates the provision of an improved practical material or metal working apparatus, in which a support or turret for a plurality of work-pieces is positioned intermediate spindle heads, and the parts are so arranged that a succession of different cutting or machining operations may be performed from opposite sides thereof with speed and accuracy. The opposite sides of each work piece are exposed so as to readily receive the different tools in rapid succession until the machining operations are completed, and this is accomplished with a minimum amount of effort and skill on the part of an operator.

It will also be apparent that, by employing a machine of the type described herein, rechucking or reclamping of work pieces is absolutely eliminated, and thus the inaccuracies otherwise introduced by such rechucking operations, are precluded. In other words, considerable time and effort are saved, and, above all, the completed article conforms with the required degree of accuracy in dimensions to render the same interchangeable.

Also, it will be noted that the drive for the spindles, as well as the support or turret for receiving the work-pieces, is so arranged that tools may readily act upon the opposite sides of the supported work-pieces, and further, that the guides provided in the work support frame insure the predetermined positioning of the tools with respect to the work-pieces during each machining operation. Attention is directed to the fact that all of the spindles rotate at a speed corresponding with the nature of the work to be performed by the tool, thereby affording the proper surface speed between the work and the cutting tool. In other words, the spindles rotate at a predetermined speed governed by the work which the tools carried thereby are to perform regardless of the indexed position of the work support.

Machines constructed in accordance with the teachings of the present invention need not have more than one unit movable during the cutting operation. In other words, during the cutting operation the work piece is held stationary, and the only part or unit which is moved is the spindle supporting head. This should be distinguished from other types of machines wherein both work support and tools must be subjected to movement in order to effect cutting operations.

The manner in which the transmission gears in the spindle head are arranged enables a variation in spindle speed to be obtained by merely making a simple gear change. Furthermore, the motor or prime mover is supported in such a manner that it may be removed or attached without disturbing the gear transmission and without subjecting said transmission to any lateral stresses or strains.

The invention also contemplates the several safety features which have been enumerated, one of which prevents forward movement of the heads until the indexing operation has taken place. The improved mechanism associated with two of the spindles in the head 36 provides very effective and practical means for superimposing additional longitudinal speed to said spindles, and thus enables all of the spindles to be driven from a common source. Machines constructed in accordance with the present invention have proven very satisfactory in the field in not only increasing production, but also in enabling work-pieces to be accurately machined within very close dimensional limits.

While specific structural features have been disclosed herein, it should be understood that the invention is capable of numerous other modifications and changes without departing from the spirit and scope of the appended claims.

Having thus described our invention, what we claim as new and desire to secure by Letters Patent is:

1. In metal working apparatus, a support for a plurality of work-pieces, spindle carrying means positioned on opposite sides of said work support, a plurality of spindles in said spindle carrying means adapted to carry tools for performing a succession of cutting operations upon each work-piece from opposite sides thereof, power means for effecting relative movement between the support carrying the spindles and the work-piece, whereby to cause the tools carried by said spindles to act upon the work from opposite sides thereof, control means for adjustably varying the speed of the power means during and in preselected timed relation with respect to the complete automatic cycle of operation of the spindle carrier, and means for indexing the work support after each machining operation, whereby to enable a succession of machining operations to be performed on each work-piece until completed.

2. In metal working apparatus, a support for a plurality of work-pieces, a housing therefor, spindle carrying means in said housing positioned on opposite sides of said work support, a plurality of spindles in said spindle carrying means adapted to carry tools for performing a succession of cutting operations upon each work-piece from opposite sides thereof, means for effecting relative movement between the spindles and the work-piece, whereby to cause the tools carried by said spindles to act upon the work from opposite sides thereof, means for indexing the work support after each machining operation, whereby to enable a succession of machining operations to be performed on each work-piece until completed, and guiding means in said housing for receiving said tools as they are advanced toward the work and positively locating said tools with respect to the work, whereby to maintain a predetermined alinement of said tools with respect to the work during the machining operation.

3. In metal working apparatus, a support for a plurality of work-pieces, a housing therefor, spindle carrying means positioned on opposite sides of said work support, a plurality of spindles in said spindle carrying means adapted to carry tools for performing a succession of cutting operations upon each work-piece from opposite sides thereof, means for effecting relative movement between the spindles and the work-piece, whereby to cause the tools carried by said spindles to act upon the work from opposite sides thereof, means for indexing the work support after each machining operation, whereby to enable a succession of machining operations to be performed on each work-piece until completed, and guides in said housing positioned on opposite sides of the work support for receiving and positively locating the tools carried by the spindles in a preselected position with respect to a supported work piece as said tools are advanced into association with the work, said guides being secured in a fixed position and adapted to accurately control the alinement of the tools with the work irrespective of any lateral stresses to which the spindles may be subjected.

4. In metal working apparatus, a support for a plurality of work-pieces, a housing therefor, spindle carrying means positioned on opposite sides of said work support, a plurality of spindles in said spindle carrying means adapted to carry tools for performing a succession of cutting operations upon each work-piece from opposite sides thereof, means for effecting relative movement between the spindles and the work-piece, whereby to cause the tools carried by said spindles to act upon the work from opposite sides thereof, means for indexing the work support after each machining operation, whereby to enable a succession of machining operations to be performed on each work-piece until completed, and means associated with at least one of the spindle carrying means and adapted to cooperate with the work support and said housing in maintaining said support in a predetermined fixed position during the machining operation, whereby to insure accuracy in the disposition of the machined area in the work-piece at each indexed position of the work support.

5. In metal working apparatus, a support for a plurality of work-pieces, reciprocable spindle carrying means positioned on opposite sides of said work support, a plurality of spindles in said spindle carrying means adapted to receive tools for performing a succession of cutting operations upon each work-piece from opposite sides thereof, a prime mover movable with each spindle carrying means for imparting rotation to said spindles, means interposed between the prime mover and the spindles for varying the speed of rotation of said spindles, means for imparting reciprocation to said spindle carrying means, whereby to cause the tools carried thereby to act upon the work from opposite sides thereof, control means for governing the variation of longitudinal speed of said tools at preselected intervals, and means for indexing the work support for each machining operation, whereby to enable a succession of machining operations to be performed on each work-piece until completed.

6. In metal working apparatus, a support for a plurality of work-pieces, reciprocable spindle carrying means positioned on opposite sides of said work support, a plurality of spindles in said spindle carrying means adapted to receive tools for performing a succession of cutting operations upon each work-piece from opposite sides thereof, a prime mover movable with each spindle carrying means for imparting rotation to said spindles, a drive shaft interposed between the prime mover and said spindles, variable speed transmission interposed between the prime mover and said drive shaft, a second variable speed transmission interposed between said drive shaft and said spindles, means for imparting reciprocation to said spindle carrying means, whereby to cause the tools carried thereby to act upon the work from opposite sides thereof, control means for governing the variation of longitudinal speed of said tools at preselected intervals, and means for indexing the work support for each machining operation, whereby to enable a succession of machining operations to be performed on each work-piece until completed.

7. In material working apparatus, a support for positioning a plurality of work-pieces about a common axis, a frame, bearing means in said frame for rotatably carrying said work support, said bearing means including bearings positioned on opposite sides of said work support, spindle heads positioned on opposite sides of said work support, a plurality of tool carrying spindles in said heads adapted to machine opposite sides of work-pieces in said support, means for indexing said support, means for securing said support against rotation during the machining operation, means carried by said frame for locating the tools in a preselected position with respect to a supported work piece, and means for relatively moving the heads with respect to said work support to effect the machining of the work-pieces from opposite sides thereof.

8. In material working apparatus, a work support including a rotatable turret, a frame having bearing means for supporting said turret at opposite sides, indexing means for imparting a step by step rotation to said turret, spindle heads positioned on opposite sides of the work support and adapted to be moved toward and away from said support, each of said heads equipped with means for effecting the movement thereof toward and away from the work support, a plurality of spindles in said heads for supporting tools to act on opposite sides of supported work pieces, guides for receiving said tools as they approach the work-pieces, whereby to maintain absolute alinement of said tools with respect to said work-pieces, and means movable with at least one of said heads for securing the turret against rotation during the machining operation of the tools.

9. In material working apparatus, a work support including a rotatable turret, a frame having bearing means for supporting said turret at opposite sides, hydraulically controlled means for imparting a step by step rotation to said turret, spindle heads positioned on opposite sides of the work support and adapted to be moved toward and away from said support, each of said heads equipped with means for effecting the movement thereof toward and away from the work support, a plurality of spindles in said heads for supporting tools to act on opposite sides of supported work-pieces, guides for receiving said tools as they approach the work-pieces, whereby to maintain absolute alinement of said tools with respect to said work-pieces, and means movable with at least one of said heads for securing the turret against rotation during the machining operation of the tools.

10. In material working apparatus, a work support including a rotatable turret, a frame having bearing means for supporting said turret at opposite sides, hydraulically controlled means for imparting a step by step rotation to said turret, spindle heads positioned on opposite sides of the work support and adapted to be moved toward and away from said support, each of said heads equipped with means for effecting the movement thereof toward and away from the work support, a plurality of spindles in said heads for supporting tools to act on opposite sides of supported work-pieces, guides for receiving said tools as they approach the work-pieces, whereby to maintain absolute alinement of said tools with respect to said work-pieces, means for securing the turret against rotation during the machining operation of the tools, and control means for automatically governing the timed operation of the indexing means and the means for effecting relative movement between the spindles and the work-piece.

11. In metal working apparatus, a support for a plurality of work-pieces, spindle carrying means positioned on opposite sides of said work support, a plurality of spindles in said spindle carrying means adapted to receive tools for performing a succession of cutting operations upon each work-piece from opposite sides thereof, means for effecting relative movement between the spindles and the work-piece, whereby to cause the tools carried by said spindles to act upon the work from opposite sides thereof, means for indexing the work support after each machining operation, whereby to enable a succession of machining operations to be performed on each work-piece until completed, guide means for receiving each tool and maintaining said tools in positive alined relationship with respect to the supported work piece companion thereto, and means for preventing the indexing of the work support during the operative association of the tools with the work.

12. In metal working apparatus, a support for a plurality of work-pieces, spindle carrying means positioned on opposite sides of said work support, a plurality of spindles in said spindle carrying means adapted to receive tools for performing a succession of cutting operations upon each work-piece from opposite sides thereof, means for effecting relative movement between the spindles and the work-piece, whereby to cause the tools carried by said spindles to act upon the work from opposite sides thereof, guide means for receiving each tool and maintaining said tools in positive alined relationship with respect to the supported work piece companion thereto, means for indexing the work support after each machining operation, whereby to enable a succession of machining operations to be performed on each work-piece until completed, and means including a guide member adapted to enter the work carrying support upon the forward advancement of the heads and thereby secure the work support against rotation during the machining operation and also accurately position the work support in its indexed position to insure accuracy in the disposition of the machined surfaces of the work-piece at each indexed position of the work support.

13. In metal working apparatus, a support for a plurality of work-pieces, spindle carrying means positioned on opposite sides of said work support, a plurality of spindles in said spindle carrying means adapted to receive tools for performing a succession of cutting operations upon each work-piece from opposite sides thereof, means for effecting relative movement at various speeds between the spindles and the work-piece, whereby to cause the tools carried by said spindles to move toward the work at a relatively rapid rate and to act upon the work from opposite sides thereof at a slower rate, means for indexing the work support after each machining operation, whereby to enable a succession of machining operations to be performed on each work-piece until completed, and means for superimposing increase in the longitudinal speed of a spindle in at least one of said heads to enable the tool supported by said spindle to properly complete the machining operation by the time the other tools have completed their machining operations.

14. In material working apparatus, a support for a plurality of work-pieces, spindle carrying means, a plurality of spindles in said carrying means adapted to receive tools for performing a succession of cutting operations upon work-pieces carried by the support, means for effecting movement of the spindle carrying means toward the work-piece, means for securing the work support in a fixed position during the machining operation, and a rack and pinion mechanism for superimposing an increase in longitudinal speed to at least one of said spindles, whereby to enable the machining operation, performed by the tool carried thereby, to be completed in accordance with the time required for the other tools to complete their machining operations.

15. In material working apparatus, a support for a plurality of work-pieces, spindle carrying means, a plurality of spindles in said carrying means adapted to receive tools for performing a succession of cutting operations upon work-pieces carried by the support, hydraulic mechanism for effecting movement of the spindle carrying means toward the work-piece at a relatively rapid rate and subsequently at a slower feeding rate, means for securing the work support in a fixed position during the machining operation, and means for superimposing an increase in longitudinal speed to at least one of said spindles, whereby to enable the machining operation, performed by the tool carried thereby, to be completed in accordance with the time required for the other tools to complete their machining operations.

16. In metal working apparatus, a support for a plurality of work-pieces, spindle carrying means positioned on opposite sides of said work support, a plurality of spindles in said spindle carrying means adapted to receive tools for performing a succession of cutting operations upon each work-piece from opposite sides thereof, means for effecting relative movement between the spindles and the work-piece, whereby to cause the tools carried by said spindles to act upon the work from opposite sides thereof, means for indexing the work support after each machining operation, whereby to enable a succession of machining operations to be performed on each work-piece until completed, and control means for initiating a continuous automatic cycle of the above mentioned machining and indexing operations and for adapting the movement of either spindle carrier to be manually controlled at the will of the operator.

17. In metal working apparatus, a support for a plurality of work-pieces, spindle carrying means positioned on opposite sides of said work support, a plurality of spindles in said spindle carrying means adapted to receive tools for performing a succession of cutting operations upon each work-piece from opposite sides thereof, means for effecting relative movement between the spindles and the work-piece, whereby to cause the tools carried by said spindles to act upon the work from opposite sides thereof, means for indexing the work support after each machining operation, whereby to enable a succession of machining operations to be performed on each work-piece until completed, clamping means for securing a work-piece on said work support, and power driven means for controlling the actuation of said clamping means.

18. In material working apparatus, a spindle head including a plurality of tool supporting spindles and a prime mover for imparting rotation to said spindles, transmission mechanism interposed between the prime mover and said spindles, a support for said prime mover whereby said prime mover may be removed without disturbing said transmission, a work support, and a head propelling mechanism driven from the prime mover and movable with the head for effecting the movement of said head as a unit toward and away from the work support.

19. In metal working apparatus, a base, a pair of oppositely disposed spindle heads reciprocably mounted upon said base, a work support positioned between said heads and mounted upon the base, said support including a pair of spaced upright frame members, a rotary device adapted to receive and support work pieces along the peripheral portion thereof, an anti-friction support in said frames for the rotary work support whereby to accurately position said work support and permit successive movement thereof from one position to another, a bar carried by at least one of the heads and adapted to pass through at least one of the frames and into said rotary work support to secure said work support against rotation during the operative association of tools with supported work pieces, means on said frames providing accurate guides for receiving tools carried by said heads to thereby accurately position said tools with respect to companion work pieces on the rotary support, power means for moving said heads toward and away from the supported work piece at variable speeds, and control means for effecting a complete automatic cycle of operation of the heads toward and away from the work support and the automatic successive shifting of the work support from one position to another.

20. A machine tool structure combining milling, drilling, and like metal removing operations, a main frame, a work supporting housing centrally located with respect to the frame, including a rotatable work supporting member adapted to shiftably support a plurality of work parts, supporting frame structures slidably mounted on said main frame in a manner to reciprocate toward and away from said work supporting housing, driving units on each supporting frame including speed and feed transmissions designed to reciprocate with its companion supporting frame, spindles driven by said transmissions adapted to carry various types of metal cutting tools, certain of said tools arranged to act upon a supported work part simultaneously on opposite sides thereof when said part occupies a preselected position, and other of said tools arranged to act from one side only when the work part occupies another preselected position, prime movers on said supporting frames coupled with said transmissions, control elements for selectively governing the direction of movement of said supporting frames, mechanical shifting means for positioning said control elements in various preselected positions, whereby to cause various speeds to be imparted to said supporting frames, and additional control elements including positive abutment means, whereby to arrest said supporting frames in a positive manner during the active engagement of said feed transmission with a preselected force to cause removal of metal by certain of the cutting tools at an extremely slow rate, whereby to remove any inaccuracies caused by uneven load conditions during the main feeding travel.

21. A machine tool structure combining milling, drilling, and like metal removing operations, a main frame, a shiftable work holding member secured to said main frame, a supporting frame mounted on said main frame in a manner to reciprocate toward and away from said work holding member, rapid driving transmission carried by said supporting frame for imparting rapid reciprocation to said supporting frame, a slow feed transmission carried by said supporting frame adapted to propel said supporting frame at various slow speeds, tool supporting means carried by said supporting frame, means for varying said slow feed transmission, power means drivingly connected to said transmission, control element for selectively causing reciprocation of said supporting frame by either of said transmissions, mechanical shifting means for positioning said control element in various preselected positions to thereby cause various speeds to be imparted to said supporting frame, and additional control elements including a positive abutment means and mechanical shifting means whereby to further decrease the feeding speed and whereby to positively arrest said supporting frame without disconnecting the slow feed transmission to thereby reduce the driving force to a preselected amount, and thus reducing the amount of relative shifting between the supporting frame and the work holding member to the amount of deflection caused during the main feeding travel.

22. A machine tool structure combining milling, drilling, and like metal removing operations, a main frame, a centrally mounted work supporting housing, a rotatable work holding member carried by said housing adapted to shiftably support a plurality of work parts, supporting frames mounted on said main frame in a manner to reciprocate toward and away from said work supporting housing, rapid driving transmissions on said supporting frames for imparting rapid reciprocation to said supporting frames, slow feed transmissions on said supporting frames adapted to propel said supporting frames at a slow speed and independently of said rapid driving transmissions, control elements for causing preselected reciprocation of said supporting frames at individual speeds, mechanical means for positioning said control elements at various preselected positions whereby to impart various speeds to said supporting frames, additional control elements including positive abutment means, means adapted to arrest said supporting frames in their forward position after a given length of travel, and means for initiating a new cycle automatically upon the return of said supporting frames to their starting positions.

23. A machine tool structure combining milling, drilling, and like metal removing operations, a main frame, a centrally mounted work supporting housing, a rotatable work holding member carried by said housing adapted to shiftably support a plurality of work parts, a supporting frame mounted on said main frame in a manner to reciprocate toward and away from said work supporting housing, rapid driving transmission on said supporting frame for imparting rapid reciprocation thereto, slow feed transmission on said supporting frame for imparting slower feeding movement thereto, control element for causing preselected reciprocation of said supporting frame, mechanical means for positioning said control element at various preselected positions whereby to impart various speeds to said supporting frame, and power means for indexing said work holding member from one position to another and for initiating each new cycle of reciprocation of said supporting frame.

24. A machine tool structure combining milling, drilling, and like metal removing operations, a main frame, a centrally mounted work supporting housing, a rotatable work holding member carried by said housing adapted to shiftably support a plurality of work parts, supporting frames mounted on said main frame in a manner to reciprocate toward and away from said work supporting housing, rapid driving transmissions on said supporting frames for imparting rapid reciprocation to said supporting frames, slow feed transmissions on said supporting frames adapted to propel said supporting frames at a low speed whereby each supporting frame may be moved at a feeding rate independently of the other, rotary spindle supporting means carried by said supporting frames and driven from said transmissions, means for effecting variation in longitudinal travel between spindle supports on at least one of said supporting frames, and control means for causing preselected reciprocation of said supporting frames in accordance with a predetermined cycle of operation.

25. A machine tool structure combining milling, drilling, and like metal removing operations, a main frame, a centrally mounted work supporting housing, a work holding member carried by said housing adapted to shiftably support a plurality of work parts, supporting frames mounted on said main frame in a manner to reciprocate toward and away from said work supporting housing, rapid driving transmissions on said supporting frames for imparting rapid reciprocation to said supporting frames, slow feed transmissions on said supporting frames adapted to propel said supporting frames at a slow speed and independently of said rapid driving transmissions, control elements for causing preselected reciprocation of said supporting frames at individual speeds, mechanical means for positioning said control elements at various preselected positions whereby to impart various speeds to said supporting frames, rotary spindle supporting means carried by said supporting frames, and additional control means for effecting the dwell of one or more of said spindles at the end of the feeding movement of said supporting frames.

26. A machine tool structure combining milling, drilling, and like metal removing operations, a main frame, a centrally mounted work supporting housing, a work holding member carried by said housing adapted to shiftably support a plurality of work parts, supporting frames mounted on said main frame in a manner to reciprocate toward and away from said work supporting housing, rapid driving transmissions on said supporting frames for imparting rapid reciprocation to said supporting frames, slow feed transmissions on said supporting frames adapted to propel said supporting frames at a slow speed and independently of said rapid driving transmissions, control elements for causing preselected reciprocation of said supporting frames at individual speeds, mechanical means for positioning said control elements at various preselected positions whereby to impart various speeds to said supporting frames, mechanical means adjustably secured to the main frame for initiating variation in feeding movement, and further control means for governing the effective length of travel after said speed has been varied.

27. A machine tool structure combining milling, drilling, and like metal removing operations, a main frame, a centrally mounted work supporting housing, a work holding member carried by said housing adapted to shiftably support a plurality of work parts, supporting frames mounted on said main frame in a manner to reciprocate toward and away from said work supporting housing, rapid driving transmissions on said supporting frames for imparting rapid reciprocation to said supporting frames, slow feed transmissions on said supporting frames adapted to propel said supporting frames at a slow speed and independently of said rapid driving transmissions, control elements for causing preselected reciprocation of said supporting frames at individual speeds, mechanical means for positioning said control elements at various preselected positions whereby to impart various speeds to said supporting frames, and means whereby the forward movement of at least one of said supporting frames may be arrested without depriving said frame of power tending to urge it toward the work holding member.

28. A machine tool structure combining milling, drilling, and like metal removing operations, a main frame, a centrally mounted work supporting housing, a work holding member carried by said housing adapted to shiftably support a plurality of work parts, supporting frames mounted on said main frame in a manner to reciprocate toward and away from said work supporting housing, rapid driving transmissions on said supporting frames for imparting rapid reciprocation to said supporting frames, slow feed transmissions on said supporting frames adapted to propel said supporting frames at a slow speed and independently of said rapid driving transmissions, control elements for causing preselected reciprocation of said supporting frames at individual speeds, mechanical means for positioning said control elements at various preselected positions whereby to impart various speeds to said supporting frames, means whereby the forward movement of at least one of said supporting frames may be effected without depriving said frame of power tending to urge it toward the work holding member, and means for varying the propelling effectiveness of the transmission tending to shift said last mentioned supporting frame at the time the forward movement thereof is arrested.

29. A machine tool structure combining milling, drilling, and like metal removing operations, a main frame, a shiftable work holding member secured to said main frame, a supporting frame mounted on said main frame in a manner to reciprocate toward and away from said work holding member, rapid driving transmission carried by said supporting frame for imparting rapid reciprocation to said supporting frame, a slow feed transmission carried by said supporting frame adapted to propel said supporting frame at various slow speeds, tool supporting means carried by said supporting frame, means for varying said slow feed transmission, power means drivingly connected to said transmission, control element for selectively causing reciprocation of said supporting frame by either of said transmissions, mechanical shifting means for positioning said control element in various preselected positions to thereby cause various speeds to be imparted to said supporting frame, and indexing mechanism for controlling the shifting of said work holding member including means for preventing the over-travel of the work holding member to thereby accurately position said work holding member for each new cycle of operation.

30. A machine tool structure combining milling, drilling, and like metal removing operations, a main frame, a shiftable work holding member secured to said main frame, a supporting frame mounted on said main frame in a manner to reciprocate toward and away from said work holding member, rapid driving transmission carried by said supporting frame for imparting rapid reciprocation to said supporting frame, a slow feed transmission carried by said supporting frame adapted to propel said supporting frame at various slow speeds, tool supporting means carried by said supporting frame, means for varying said slow feed transmission, power means drivingly connected to said transmission, control element for selectively causing reciprocation of said supporting frame by either of said transmissions, mechanical shifting means for positioning said control element in various preselected positions to thereby cause various speeds to be imparted to said supporting frame, indexing mechanism for controlling the shifting of the work holding member from one position to another, and valve means synchronously coupled with said transmissions in a manner to prevent advancement of said supporting frame until the indexing of the work holding member has been completed.

31. A machine tool structure combining milling, drilling, and like metal removing operations, a main frame, a shiftable work holding member secured to said main frame, a supporting frame mounted on said main frame in a manner to reciprocate toward and away from said work holding member, rapid driving transmission carried by said supporting frame for imparting rapid reciprocation to said supporting frame, a slow feed transmission carried by said supporting frame adapted to propel said supporting frame at various slow speeds, tool supporting means carried by said supporting frame, means for varying said slow feed transmission, power means drivingly connected to said transmission, control element for selectively causing reciprocation of said supporting frame by either of said transmissions, mechanical shifting means for positioning said control element in various preselected positions to thereby cause various speeds to be imparted to said supporting frame, and abutment means for arresting the forward movement of said supporting frame at the end of the feeding stroke, said control element serving at this point in the cycle of operation to control the release of propelling power before reversal of said supporting frame occurs.

32. A machine tool structure combining milling, drilling, and like metal removing operations, a main frame, a shiftable work holding member secured to said main frame, a supporting frame mounted on said main frame in a manner to reciprocate toward and away from said work holding member, rapid driving transmission carried by said supporting frame for imparting rapid reciprocation to said supporting frame, a slow feed transmission carried by said supporting frame adapted to propel said supporting frame at various slow speeds, tool supporting means carried by said supporting frame, means for varying said slow feed transmission, power means drivingly connected to said transmission, control element for selectively causing reciprocation of said supporting frame by either of said transmissions, mechanical shifting means for positioning said control element in various preselected positions to thereby cause various speeds to be imparted to said supporting frame, and power storing means associated with said control element for use in shifting said element to a position for reversing the movement of said supporting frame.

33. A machine tool structure combining milling, drilling, and like metal removing operations, a main frame, a shiftable work holding member secured to said main frame, a supporting frame mounted on said main frame in a manner to reciprocate toward and away from said work holding member, rapid driving transmission carried by said supporting frame for imparting rapid reciprocation to said supporting frame, a slow feed transmission carried by said supporting frame adapted to propel said supporting frame at various slow speeds, tool supporting means carried by said supporting frame, means for varying said slow feed transmission, power means drivingly connected to said transmission, control element for selectively causing reciprocation of said supporting frame by either of said transmissions, mechanical shifting means for positioning said control element in various preselected positions to thereby cause various speeds to be imparted to said supporting frame, a positive stop for arresting the forward movement of said supporting frame during the slow feeding speed without disconnecting the slow feed transmission, and a shiftable element responsive to the stopping of said supporting frame for rendering said slow feed transmission ineffective.

34. A machine tool structure combining milling, drilling, and like metal removing operations, a main frame, a shiftable work holding member secured to said main frame, a supporting frame mounted on said main frame in a manner to reciprocate toward and away from said work holding member, rapid driving transmission carried by said supporting frame for imparting rapid reciprocation to said supporting frame, a slow feed transmission carried by said supporting frame adapted to propel said supporting frame at various slow speeds, tool supporting means carried by said supporting frame, means for varying said slow feed transmission, power means drivingly connected to said transmission, control element for selectively causing reciprocation of said supporting frame by either of said transmissions, mechanical shifting means for positioning said control element in various preselected positions to thereby cause various speeds to be imparted to said supporting frame, a positive stop for arresting the forward movement of said supporting frame during the slow feeding speed without disconnecting the slow feed transmission, and a shiftable element responsive to the stopping of said supporting frame for rendering said slow feed transmission ineffective and for causing said control element to be shifted to a reverse position.

35. A machine tool structure combining milling, drilling, and like metal removing operations, a main frame, a shiftable work holding member secured to said main frame, a supporting frame mounted on said main frame in a manner to reciprocate toward and away from said work holding member, rapid driving transmission carried by said supporting frame for imparting rapid reciprocation to said supporting frame, a slow feed transmission carried by said supporting frame adapted to propel said supporting frame at various slow speeds, tool supporting means carried by said supporting frame, means for varying said slow feed transmission, power means drivingly connected to said transmission, control element for selectively causing reciprocation of said supporting frame by either of said transmissions, mechanical shifting means for positioning said control element in various preselected positions to thereby cause various speeds to be imparted to said supporting frame, indexing means for shifting said work holding member from one position to another, and power means for shifting said indexing means, said power means being operable independently of said supporting frame.

36. A machine tool structure combining milling, drilling, and like metal removing operations, a main frame, a shiftable work holding member secured to said main frame, a supporting frame mounted on said main frame in a manner to reciprocate toward and away from said work holding member, rapid driving transmission carried by said supporting frame for imparting rapid reciprocation to said supporting frame, a slow feed transmission carried by said supporting frame adapted to propel said supporting frame at various slow speeds, tool supporting means carried by said supporting frame, means for varying said slow feed transmission, power means drivingly connected to said transmission, control element for selectively causing reciprocation of said supporting frame by either of said transmissions, mechanical shifting means for positioning said control element in various preselected positions to thereby cause various speeds to be imparted to said supporting frame, indexing means for shifting said work holding member from one position to another, power means for shifting said indexing means, said power means being operable independently of said supporting frame, and means controlled in response to the functioning of said last mentioned power means for effecting continuous reciprocation of said supporting frame.

37. In a machine tool, the combination of a main frame structure having a supporting surface, a self-contained actuator unit mounted on said supporting surface including a unitary head frame structure, a spindle rotatably mounted on said head frame, hydraulically responsive means connected with said head frame for imparting translation to said spindle in a direction parallel with said supporting surface, said hydraulically responsive means including a fluid receiving cylinder, a prime mover such as an electric motor on said head frame for rotating said spindle, pumping means on said head frame driven from said prime mover for delivering fluid to said cylinder, valve means on said head frame adapted to control the rate and direction of flow of fluid from said pumping means into said cylinder in timed relation with the translation of said spindle, said head frame supporting the aforementioned elements so as to present a self-contained actuator unit, a shiftable work holder cooperatively positioned with respect to the spindle carried by said head frame, and means for effecting the shifting of said work holder in timed relation with the translation of said spindle whereby to enable work pieces carried by said work holder to be successively machined.

38. In a machine tool, the combination of a main frame structure having a supporting surface, a self-contained actuator unit mounted on said supporting surface including a unitary head frame structure, a spindle rotatably mounted on said head frame, a shiftable translating element carried by said head frame, mechanism carried by the head frame for moving said translating element at a feeding rate, a prime mover mounted on said head frame for imparting rotation to said spindle and operatively coupled for driving purposes with said mechanism, power driven mechanism carried by the head frame for moving said translating element at a faster rate, control means on the head frame adapted to selectively govern the operative effectiveness of said mechanisms upon said translating element, said head frame and element supported thereby presenting a self-contained actuator unit, a shiftable work holder cooperatively positioned with respect to the spindle carried by said head frame, and means for effecting the shifting of the work holder in timed relation with the translation of said spindle whereby to enable work pieces carried by said work holder to be successively machined.

39. In a machine tool, the combination of a main frame structure having a supporting surface, a self-contained actuator unit mounted on said supporting surface including a unitary head frame structure, a spindle rotatably mounted on said head frame, hydraulically responsive means connected with said head frame for imparting translation to said spindle in a direction parallel with said supporting surface, said hydraulically responsive means including a fluid receiving cylinder, a prime mover such as an electric motor on said head frame for rotating said spindle, pumping means on said head frame driven from said prime mover for delivering fluid to said cylinder, valve means on said head frame adapted to control the rate and direction of flow of fluid from said pumping means into said cylinder in timed relation with the translation of said spindle, said head frame supporting the aforementioned elements so as to present a self-contained actuator unit, a self-contained supporting frame including shiftable work supporting structure cooperatively positioned with respect to the spindle carried by said head frame, and means for effecting the shifting of said work supporting structure in timed relation with the translation of said spindle whereby to enable work pieces carried by said work supporting structure to be successively machined.

40. In a machine tool, the combination of a main frame structure having a supporting surface, a self-contained actuator unit mounted on said supporting surface including a unitary head frame structure, a spindle rotatably mounted on said head frame, hydraulically responsive means connected with said head frame for imparting translation to said spindle in a direction parallel with said supporting surface, said hydraulically responsive means including a fluid receiving cylinder, a prime mover such as an electric motor on said head frame for rotating said spindle, pumping means on said head frame driven from said prime mover for delivering fluid to said cylinder, valve means on said head frame adapted to control the rate and direction of flow of fluid from said pumping means into said cylinder in timed relation with the translation of said spindle, said head frame supporting the aforementioned elements so as to present a self-contained actuator unit, a shiftable work holder cooperatively positioned with respect to the spindle carried by said head frame, means for effecting the shifting of said work holder in timed relation with the translation of said spindle whereby to enable work pieces carried by said work holder to be successively machined, and shiftable means for positively insuring a preselected alinement between said spindle and the work piece carried by the work holder.

41. In a machine tool, the combination of a main frame structure having a supporting surface, a self-contained actuator unit mounted on said supporting surface including a unitary head frame structure, a spindle rotatably mounted on said head frame, hydraulically responsive means connected with said head frame for imparting translation to said spindle in a direction parallel with said supporting surface, said hydraulically responsive means including a fluid receiving cylinder, a prime mover such as an electric motor on said head frame for rotating said spindle, pumping means on said head frame driven from said prime mover for delivering fluid to said cylinder, valve means on said head frame adapted to control the rate and direction of flow of fluid from said pumping means into said cylinder in timed relation with the translation of said spindle, said head frame supporting the aforementioned elements so as to present a self-contained actuator unit, a shiftable work holder cooperatively positioned with respect to the spindle carried by said head frame, and hydraulic actuator means for effecting the shifting of said work holder in timed relation with the translation of said spindle whereby to enable work pieces carried by said work holder to be successively machined.

42. In a machine tool, the combination of a main frame structure having a supporting surface, a self-contained actuator unit mounted on said supporting surface including a unitary head frame structure, a plurality of spindles and cutting tools rotatably mounted on said head frame, hydraulically responsive means connected with said head frame for imparting translation to said spindles in a direction parallel with said supporting surface, said hydraulically responsive means including a fluid receiving cylinder, a prime mover such as an electric motor on said head frame for rotating said spindles, pumping means on said head frame driven from said prime mover for delivering fluid to said cylinder, valve means on said head frame adapted to control the rate and direction of flow of fluid from said pumping means into said cylinder in timed relation with the translation of said spindles, said head frame supporting the aforementioned elements so as to present a self-contained actuator unit, a shiftable work holder cooperatively positioned with respect to the spindles carried by said head frame, and means for effecting the shifting of said work holder in timed relation with the translation of said spindles whereby to enable work pieces carried by said work holder to be successively machined.

43. In a machine tool, the combination of a main frame structure having a supporting surface, a self-contained actuator unit mounted on said supporting surface including a unitary head frame structure, a spindle rotatably mounted on said head frame, hydraulically responsive means connected with said head frame for imparting translation to said spindle in a direction parallel with said supporting surface, said hydraulically responsive means including a fluid receiving cylinder, a prime mover such as an electric motor on said head frame for rotating said spindle, pumping means on said head frame driven from said prime mover for delivering fluid to said cylinder, valve means on said head frame adapted to control the rate and direction of flow of fluid from said pumping means into said cylinder in timed relation with the translation of said spindle, said head frame supporting the aforementioned elements so as to present a self-contained actuator unit, a second self-contained actuator unit similar to the first mentioned actuator unit and similarly mounted on said supporting surface, a shiftable work holder cooperatively positioned with respect to the spindle carried by said actuator units whereby to enable the machining of a work piece from opposite sides thereof, and means for effecting the shifting of said work holder in timed relation with the translation of said actuator units whereby to enable work pieces carried by said work holder to be successively machined.

44. In a machine tool, the combination of a main frame structure having a supporting surface, a self-contained actuator unit mounted on said supporting surface including a unitary head frame structure, a spindle rotatably mounted on said head frame, hydraulically responsive means connected with said head frame for imparting translation to said spindle in a direction parallel with said supporting surface, said hydraulically responsive means including a fluid receiving cylinder, a prime mover such as an electric motor on said head frame for rotating said spindle, pumping means on said head frame driven from said prime mover for delivering fluid to said cylinder, valve means on said head frame adapted to control the rate and direction of flow of fluid from said pumping means into said cylinder in timed relation with the translation of said spindle, said head frame supporting the aforementioned elements so as to present a self-contained actuator unit, a second self-contained actuator unit similar to the first mentioned actuator unit and similarly mounted on said supporting surface, a shiftable work holder cooperatively positioned with respect to the spindle carried by said actuator units whereby to enable the machining of a work piece from opposite sides thereof, means for effecting the shifting of said work holder in timed relation with the translation of said actuator units whereby to enable work pieces carried by said work holder to be successively machined, and guiding means for receiving tools carried by said actuator units as they are advanced toward the work and for positively locating said tools with respect to the work, whereby to maintain a predetermined alinement of said tools with respect to the work during the machining operation.

45. In a machine tool, a self-contained supporting frame, bearing means positioned in said frame, a rotatable work supporting and shifting structure arranged to be rotated in said bearing means, power responsive means connected to said rotatable work supporting structure for shifting said structure in a step by step manner, power means associated with said supporting frame for propelling said power responsive means, a supported spindle translatable with respect to said work supporting structure, means for shifting said supported spindle, and positive interlocking means shiftable in response to the translation of said spindle for precluding the shifting of said work supporting structure during a preselected interval of translation of said spindle.

46. A self-contained actuator unit including a unitary head frame structure adapted to be mounted upon a supporting surface of a machine frame, a spindle rotatably mounted on said head frame, the axis thereof being parallel with the supporting surface of the machine frame to which the head frame is applied, a shiftable translating element carried by said head frame, mechanism carried by the head frame for moving said translating element at a feeding rate including means whereby the feeding rate of said translating element may be adjusted, a prime mover mounted on said head frame for imparting rotation to said spindle and operatively coupled for driving purposes with said feeding mechanism, power driven mechanism carried by the head frame for moving said translating element at a faster rate, control means on said head frame adapted to selectively control the operative effectiveness of said mechanisms upon said translating element, said head frame and elements supported thereby presenting a self-contained actuator unit, a self-contained supporting frame, means positioned in said frame, a rotatable work supporting and shifting structure arranged to be rotated in said bearing means, power responsive means connected to said rotatable work supporting structure for shifting said supporting structure in a step by step manner, and positive interlocking means shiftable in response to the translation of said spindle for precluding the shifting of said work supporting structure during a preselected interval of said translation of the spindle.

47. In a machine tool, the combination of a main frame structure having a supporting surface, a self-contained actuator unit mounted on said supporting surface including a unitary head frame structure, a spindle rotatably mounted on said head frame, hydraulically responsive means connected with said head frame for imparting translation to said spindle in a direction parallel with said supporting surface, said hydraulically responsive means including a fluid receiving cylinder, a prime mover such as an electric motor on said head frame for rotating said spindle, pumping means on said head frame driven from said prime mover for delivering fluid to said cylinder, valve means on said head frame adapted to control the rate and direction of flow of fluid from said pumping means into said cylinder in timed relation with the translation of said spindle, said head frame supporting the aforementioned elements so as to present a self-contained actuator unit, a self-contained supporting frame including shiftable work supporting structure cooperatively positioned with respect to the spindle carried by said head frame, means for effecting the shifting of said work supporting structure in timed relation with the translation of said spindle whereby to enable work pieces carried by said work supporting structure to be successively machined, and power means for preventing the translation of said spindle until the work supporting structure has completed its movement.

48. In a machine tool, the combination of a main frame structure having a supporting surface, a self-contained actuator unit mounted on said supporting surface including a unitary head frame structure, a spindle rotatably mounted on said head frame, hydraulically responsive means connected with said head frame for imparting translation to said spindle in a direction parallel with said supporting surface, said hydraulically responsive means including a fluid receiving cylinder, a prime mover such as an electric motor on said head frame for rotating said spindle, pumping means on said head frame driven from said prime mover for delivering fluid to said cylinder, valve means on said head frame adapted to control the rate and direction of flow of fluid from said pumping means into said cylinder in timed relation with the translation of said spindle, said head frame supporting the aforementioned elements so as to present a self-contained actuator unit, said hydraulic arrangement being such as to enable the translation of said spindle at a plurality of feeding rates, a shiftable work holder cooperatively positioned with respect to the spindle carried by said head frame, and means for effecting the shifting of said work holder in timed relation with the translation of said spindle whereby to enable work pieces carried by said work holder to be successively machined.

JOHN S. BARNES.
PAUL R. GUIRL.
GEORGE C. JOHNSON.

---

CERTIFICATE OF CORRECTION.

Patent No. 2,098,220. November 9, 1937.

JOHN S. BARNES, ET AL.

It is hereby certified that error appears in the printed specification of the above numbered patent requiring correction as follows: Page 8, second column, line 25, claim 2, strike out the words "in said housing"; and that the said Letters Patent should be read with this correction therein that the same may conform to the record of the case in the Patent Office.

Signed and sealed this 25th day of August, A. D. 1942.

Henry Van Arsdale,
(Seal) Acting Commissioner of Patents.

---

DISCLAIMER 2,098,220.—*John S. Barnes, Paul R. Guirl,* and *George C. Johnson,* Rockford, Ill. MATERIAL WORKING APPARATUS. Patent dated November 9, 1937. Disclaimer filed September 24, 1943, by the assignee, *Odin Corporation.*

Hereby enters this disclaimer to claims 37, 38, 39, 40, 41, 42, 43, 44, 45, 46, 47 and 48.

[*Official Gazette November 9, 1943.*]

ing said supporting structure in a step by step manner, and positive interlocking means shiftable in response to the translation of said spindle for precluding the shifting of said work supporting structure during a preselected interval of said translation of the spindle.

47. In a machine tool, the combination of a main frame structure having a supporting surface, a self-contained actuator unit mounted on said supporting surface including a unitary head frame structure, a spindle rotatably mounted on said head frame, hydraulically responsive means connected with said head frame for imparting translation to said spindle in a direction parallel with said supporting surface, said hydraulically responsive means including a fluid receiving cylinder, a prime mover such as an electric motor on said head frame for rotating said spindle, pumping means on said head frame driven from said prime mover for delivering fluid to said cylinder, valve means on said head frame adapted to control the rate and direction of flow of fluid from said pumping means into said cylinder in timed relation with the translation of said spindle, said head frame supporting the aforementioned elements so as to present a self-contained actuator unit, a self-contained supporting frame including shiftable work supporting structure cooperatively positioned with respect to the spindle carried by said head frame, means for effecting the shifting of said work supporting structure in timed relation with the translation of said spindle whereby to enable work pieces carried by said work supporting structure to be successively machined, and power means for preventing the translation of said spindle until the work supporting structure has completed its movement.

48. In a machine tool, the combination of a main frame structure having a supporting surface, a self-contained actuator unit mounted on said supporting surface including a unitary head frame structure, a spindle rotatably mounted on said head frame, hydraulically responsive means connected with said head frame for imparting translation to said spindle in a direction parallel with said supporting surface, said hydraulically responsive means including a fluid receiving cylinder, a prime mover such as an electric motor on said head frame for rotating said spindle, pumping means on said head frame driven from said prime mover for delivering fluid to said cylinder, valve means on said head frame adapted to control the rate and direction of flow of fluid from said pumping means into said cylinder in timed relation with the translation of said spindle, said head frame supporting the aforementioned elements so as to present a self-contained actuator unit, said hydraulic arrangement being such as to enable the translation of said spindle at a plurality of feeding rates, a shiftable work holder cooperatively positioned with respect to the spindle carried by said head frame, and means for effecting the shifting of said work holder in timed relation with the translation of said spindle whereby to enable work pieces carried by said work holder to be successively machined.

JOHN S. BARNES.
PAUL R. GUIRL.
GEORGE C. JOHNSON.

CERTIFICATE OF CORRECTION.

Patent No. 2,098,220.      November 9, 1937.

JOHN S. BARNES, ET AL.

It is hereby certified that error appears in the printed specification of the above numbered patent requiring correction as follows: Page 8, second column, line 25, claim 2, strike out the words "in said housing"; and that the said Letters Patent should be read with this correction therein that the same may conform to the record of the case in the Patent Office.

Signed and sealed this 25th day of August, A. D. 1942.

(Seal)      Henry Van Arsdale,
Acting Commissioner of Patents.

DISCLAIMER 2,098,220.—*John S. Barnes, Paul R. Guirl,* and *George C. Johnson,* Rockford, Ill. MATERIAL WORKING APPARATUS. Patent dated November 9, 1937. Disclaimer filed September 24, 1943, by the assignee, *Odin Corporation.*

Hereby enters this disclaimer to claims 37, 38, 39, 40, 41, 42, 43, 44, 45, 46, 47 and 48.

[*Official Gazette November 9, 1943.*]

CERTIFICATE OF CORRECTION.

Patent No. 2,098,220. November 9, 1937.

JOHN S. BARNES, ET AL.

It is hereby certified that error appears in the printed specification of the above numbered patent requiring correction as follows: Page 8, second column, line 25, claim 2, strike out the words "in said housing"; and that the said Letters Patent should be read with this correction therein that the same may conform to the record of the case in the Patent Office.

Signed and sealed this 25th day of August, A. D. 1942.

(Seal)

Henry Van Arsdale,
Acting Commissioner of Patents.

DISCLAIMER 2,098,220.—*John S. Barnes*, *Paul R. Guirl*, and *George C. Johnson*, Rockford, Ill. MATERIAL WORKING APPARATUS. Patent dated November 9, 1937. Disclaimer filed September 24, 1943, by the assignee, *Odin Corporation*.

Hereby enters this disclaimer to claims 37, 38, 39, 40, 41, 42, 43, 44, 45, 46, 47 and 48.

[*Official Gazette November 9, 1943.*]